(12) United States Patent
Obara et al.

(10) Patent No.: US 10,623,910 B2
(45) Date of Patent: Apr. 14, 2020

(54) SERVER DEVICE AND COMMUNICATION METHOD

(71) Applicant: NTT DOCOMO, INC., Tokyo (JP)

(72) Inventors: Tatsunori Obara, Tokyo (JP); Shinpei Yasukawa, Tokyo (JP); Riichi Kudou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,455

(22) PCT Filed: Sep. 27, 2017

(86) PCT No.: PCT/JP2017/035015
§ 371 (c)(1),
(2) Date: Mar. 28, 2019

(87) PCT Pub. No.: WO2018/062301
PCT Pub. Date: Apr. 5, 2018

(65) Prior Publication Data
US 2019/0349713 A1    Nov. 14, 2019

(30) Foreign Application Priority Data
Sep. 30, 2016   (JP) ................................ 2016-193759

(51) Int. Cl.
*H04W 4/029* (2018.01)
*H04W 4/40* (2018.01)
*H04W 72/12* (2009.01)

(52) U.S. Cl.
CPC ............ *H04W 4/029* (2018.02); *H04W 4/40* (2018.02); *H04W 72/12* (2013.01)

(58) Field of Classification Search
CPC ........ H04W 4/021; H04W 4/06; H04W 74/08
See application file for complete search history.

(56) References Cited

U.S. PATENT DOCUMENTS

| | | | |
|---|---|---|---|
| 2005/0003825 A1* | 1/2005 | Miyake | H04W 16/00 455/452.2 |
| 2011/0039562 A1* | 2/2011 | Balasubramanian | H04W 36/0033 455/436 |
| 2015/0215028 A1* | 7/2015 | Ljung | H04W 88/04 370/315 |
| 2017/0013598 A1* | 1/2017 | Jung | H04W 72/02 |
| 2017/0105179 A1* | 4/2017 | Kusashima | H04W 52/30 |
| 2019/0207663 A1* | 7/2019 | Shimezawa | H04W 24/10 |

OTHER PUBLICATIONS

International Search Report issued in PCT/JP2017/035015 dated Dec. 12, 2017 (4 pages).

(Continued)

*Primary Examiner* — Diane D Mizrahi
(74) *Attorney, Agent, or Firm* — Osha Liang LLP

(57) ABSTRACT

A server device for determining, on the basis of a communication cost in a communication area in which at least one terminal is communicatable and the position of the at least one terminal, a first terminal to which uplink data is to be transmitted in a first communication area, in which the communication cost is less than a threshold, transmitting to the first terminal an indication for uplink data transmission in the first communication area, and receiving uplink data from the first terminal.

6 Claims, 12 Drawing Sheets

(56) References Cited

OTHER PUBLICATIONS

Written Opinion of the International Searching Authority issued in PCT/JP2017/035015 dated Dec. 12, 2017 (4 pages).
Seo, H. et al.; "LTE Evolution for Vehicle-to-Everything Services"; IEEE Communication Magazine, vol. 54, No. 6, Jun. 2016, pp. 22-28 (7 pages).

* cited by examiner

SERVER DEVICE AND COMMUNICATION METHOD

TECHNICAL FIELD

The present invention relates to a server apparatus and a communication method.

BACKGROUND ART

Utilizing vehicle to everything (V2X) communication in order to realize sophistication of intelligent transport systems (ITS) services such as automatic driving or traffic accident prevention has been studied (see, for example, NPL 1).

Examples of the V2X communication include vehicle to vehicle communication (V2V communication), vehicle to infrastructure such as a road side unit installed on a traffic light or a sign and/or the like, the cellular network communication (V2I communication/V2N communication), and vehicle to pedestrian communication (V2P communication), and/or the like.

In addition, in the V2X communication, the introduction of a new communication scheme is under review. Examples of a communication system used for the V2X communication may include a cellular network such as a wireless LAN of IEEE 802.11p and/or the like, long term evolution (LTE), or 5th generation mobile communication system (5G), and/or the like In the future, to realize the V2X communication, it is assumed that a collection of environmental information indicating the road environment is to become more active, and communication traffic of sensor information (that is, uplink (UL) data) from a vehicle is dramatically increased.

CITATION LIST

Non-Patent Literature

NPL 1
Hanbyul Seo, Ki-Dong Lee, Shinpei Yasukawa, Ying Peng, Philippe Sartori, "LTE evolution for vehicle-to-everything services," IEEE Communication Magazine, vol. 54, no. 6, pp. 22-28, June 2016.

SUMMARY OF INVENTION

Technical Problem

In the V2X communication, it is required to communicate UL data from a terminal (also referred to as user equipment (UE)) at a lower cost.

An object of the present invention is to provide a server apparatus and a communication method capable of performing UL data communication from a terminal at a lower cost in V2X communication.

Solution

A server apparatus according to an aspect of the present invention includes: a determiner that determines a first terminal which transmits uplink data in a first communication area in which communication cost is less than a first threshold value, based on the communication cost and a location of at least one terminal in a communication area in which the at least one terminal is communicable; and a communicator that transmits a transmission instruction of the uplink data in the first communication area to the first terminal and receives the uplink data from the first terminal.

Advantageous Effects of Invention

According to an aspect of the present invention, it is possible to communicate UL data from a terminal at a lower cost in the V2X communication.

DESCRIPTION OF EMBODIMENTS

Background of the Invention

Figure 1:
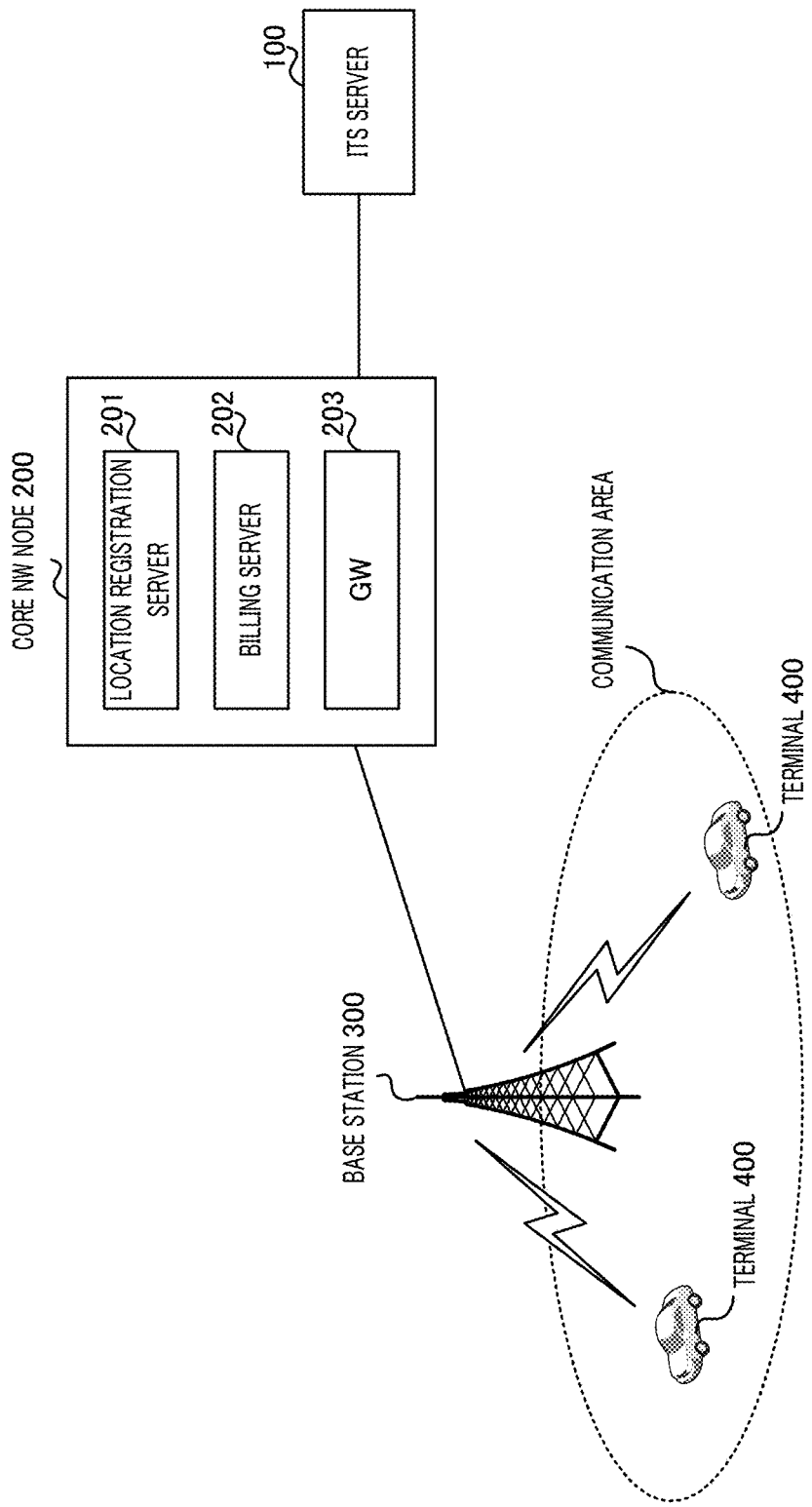
FIG. 1 is a diagram illustrating a configuration example of a communication system according to an embodiment.

Traffic such as environmental information uploaded in V2X communication is different from ordinary data communication in that reducing communication cost (sometimes referred to as "bit cost" or simply "cost") is more emphasized than improving communication quality. In addition, the environmental information uploaded in the V2X communication has a relatively low urgency, and uploading with a low delay is not required.

The "communication cost" is an index indicating how much communication cost is required for a terminal to be able to perform communication. For example, the communication cost may be calculated based on at least one of a bit unit price used for communication per unit time, the amount of resources occupied in communication, frequency use efficiency per transmission (modulation and coding scheme (MCS) or scheduling policy). It should be noted that parameters used for calculating the communication cost are not limited to these parameters, and may be parameters related to a communication fee charged to a terminal.

The present inventors have studied a communication method capable of performing the transmission of the UL data performed by a terminal at a lower cost in V2X communication.

The communication cost depends on an operational expenditure of a base station. In addition, the operational expenditure of the base station is determined according to communication traffic at a peak time in the communication area and time in which the terminal can perform communication. That is, as the communication traffic at the peak time is increased, the operational expenditure of the base station is increased, resulting in an increase in communication cost.

Therefore, in order to reduce the communication traffic at the peak time, it is expected to perform operations (for example, sometimes referred to as off-load, peak shift, bottom up) to urge communication in the communication area or time with a low communication unit price in the future by increasing a communication unit price of a communication area or a time in which the communication traffic is increased and the resource use efficiency is high and lowering a communication unit price of a communication area or a time in which the communication traffic is decreased and the resource use efficiency is low.

In uplink communication in the V2X communication, since upload is not required with a low delay and a transmission control for offloading a communication volume can be performed at least geographically or temporally, when the operation is applied, the terminal transmits UL data in the communication area or time in which the communication unit price is low, and as result can meet the demand for communication cost reduction in the V2X communication.

The present inventors have reached the present invention in consideration of this point. Specifically, in the communication area (coverage) in which the terminal can perform communication, the area in which the communication cost is low or the transmission time (timing) when the communication cost is low is specified, and the terminal is instructed to transmit the UL data in the area or transmission time in which the communication cost is low.

In the V2X communication, it is not necessary to uniquely determine the terminal that uploads environmental information. For example, in the ITS system utilizing the V2X communication, the environmental information (sensing result) need not be reported to a specific terminal in each area, and the environmental information can be collected from any terminal (vehicle).

Hereinafter, an embodiment of the present invention will be described in detail with reference to the accompanying drawings.

[Configuration of Communication System]

FIG. 1 illustrates a configuration example of a communication system according to the present embodiment. The communication system illustrated in FIG. 1 at least includes ITS server (server apparatus) 100, core network node (core NW node) 200, base station (sometimes referred to as eNB) 300, and terminal 400. For example, core NW node 200, base station 300, and terminal 400 configure, for example, a cellular network (for example, a 5G system and/or the like).

ITS server 100 (server apparatus) is an application server that provides ITS services using the V2X communication. ITS server 100 collects, from terminal 400 mounted on each of a plurality of vehicles, environmental information on road environment within a communication area covered by base station 300, and performs a process on the ITS services such as an automatic operation or traffic accident prevention based on the collected environmental information.

In addition, when collecting the environmental information (UL data) from terminal 400, ITS server 100 transmits information (hereinafter, referred to as "cost information") indicating the communication cost in each of the communication areas of base station 300 and information (hereinafter, referred to as "location information") indicating a location of terminal 400 from core NW node 200.

In addition, in the cost information, the communication cost may be associated with, for example, a combination of the communication area in which terminal 400 can perform communication and the transmission time in the communication area. In the cost information, either the communication area or the transmission time may be associated with the communication cost. In addition, the case where the cost information is generated in core NW node 200 will be described below. However, the cost information may be generated in ITS server 100. In this case, ITS server 100 acquires, from core NW node 200, parameters (location information of terminal 400, billing information, and/or the like) required for generating the cost information.

Based on the cost information and the location information, ITS server 100 determines terminal 400 which performs communication (hereinafter referred to as "low cost communication") requiring a low cost in the communication area and the transmission time in which the communication cost required for communication of the UL data is low. Then, ITS server 100 transmits a transmission instruction of the UL data to the determined terminal 400 in the communication area and time in which the low cost communication is possible. In addition, ITS server 100 may acquire information (hereinafter, referred to as "quality information") indicating radio quality of terminal 400, and transmit the transmission instruction of the UL data to terminal 400 (terminal 400 in which the radio quality is good) in which the radio quality is equal to or greater than a predetermined threshold value.

Core NW node 200 accommodates at least one radio access network (base station 300). Core NW node 200 includes, for example, location registration server 201 (for example, mobility management entity (MME)) which registers the location of terminal 400 within the communication area of base station 300, billing server 202 which manages the billing of each terminal 400, and gateway (GW) 203 which is connected to the external system (for example, ITS server 100).

In the present embodiment, billing server 202 manages the cost information in the communication area of each base station 300 in addition to the process of managing the billing of each terminal 400. For example, by associating the location of terminal 400 registered in location registration server 201 with the billing information of terminal 400 at the location, billing server 202 manages whether to perform communication based on which communication cost in each communication area as the cost information.

Base station 300 performs communication by connecting to terminal 400 or core NW node 200 present within the communication area covered by base station 300. In addition, base station 300 allocates a UL resource to terminal 400 according to a resource allocation request (for example, a scheduling request or a buffer status report (BSR)) of the UL data from terminal 400.

For example, terminal 400 is mounted on a vehicle, and uploads the UL data (environmental information) indicating a sensing result obtained by a sensor installed in the vehicle and provided in the vehicle onto ITS server 100 via base station 300 and core NW node 200. When transmitting the UL data, terminal 400 transmits environmental information (that is, UL data) according to the transmission instruction (UL transmission trigger) performed by ITS server 100. By uploading the environmental information by at least one terminal 400 in the communication area of base station 300, ITS server 100 can understand conditions (for example, road condition) in the communication area.

It should be noted that terminal 400 may support both low cost communication such as the V2X communication and communication (hereinafter referred to as "normal cost communication") which does not requiring low cost such as normal data communication. In the following, each communication is identified by a "cost class" classifying communication (low cost communication and normal cost communication) according to the required communication cost. For example, the cost class may be identified according to quality of a service class identifier (QCI).

For example, terminal 400 may perform a plurality of logical connections (for example, a bearer connection or a packet data network (PDN) connection) with core NW node 200 to identify the cost classes for each logical connection.

In addition, in terminal 400, when meeting the predetermined conditions (for example, the communication cost or the conditions related to the communication quality), an uplink transmission packet (for example, environmental information) is passed from a higher layer (application layer, an Internet protocol (IP) layer, and/or the like) to a lower layer (physical (PHY) layer, medium access control (MAC)). In the lower layer, terminal 400 may identify the low cost communication and the normal cost communication from each other on a packet basis or on a logical channel basis and transmit the transmission packet. On the other hand, if the predetermined condition is not satisfied, terminal 400 does not output an uplink transmission packet from the higher layer to the lower layer. Through this process, it is possible to avoid communication which unintentionally increases costs.

[Configuration of ITS Server]

Figure 2:
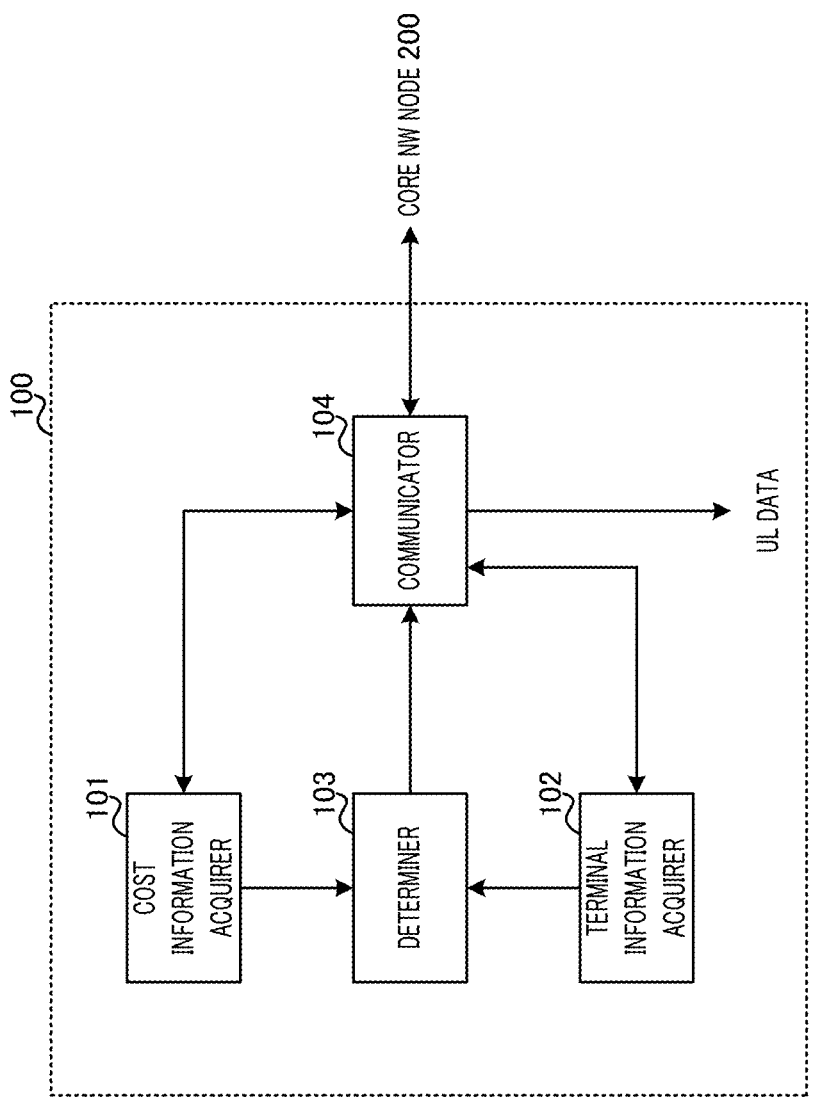
FIG. 2 is a block diagram illustrating a configuration example of an ITS server according to an embodiment.

FIG. 2 illustrates a configuration example of ITS server 100 according to the present embodiment. ITS server 100 illustrated in FIG. 2 adopts a configuration including cost information acquirer 101, terminal information acquirer 102, determiner 103, and communicator 104.

Cost information acquirer 101 acquires cost information indicating the communication cost in each of the communication areas of base station 300 from core NW node 200 via communicator 104. Specifically, cost information acquirer 101 transmits signaling for inquiring the cost information to core NW node 200 via communicator 104. Cost information acquirer 101 outputs the cost information acquired by the inquiry to determiner 103.

Terminal information acquirer 102 acquires terminal information, which includes location information indicating the location of terminal 400 and quality information indicating the radio quality of terminal 400, from core NW node 200 via communicator 104. Specifically, terminal information acquirer 102 transmits the signaling for inquiring the terminal information to core NW node 200 or terminal 400 via communicator 104. Terminal information acquirer 102 outputs the terminal information acquired by the inquiry to determiner 103.

Determiner 103 determines terminal 400 which transmits the UL data such as the environmental information and the area and the transmission time in which the UL data are transmitted to terminal 400 based on the cost information input from cost information acquirer 101 and the terminal information (location information, quality information) input from terminal information acquirer 102.

For example, determiner 103 specifies the communication area and the transmission time (for example, the communication area and the transmission time in which the communication cost is less than the predetermined threshold value) of the communication cost classified as the low cost among the communication costs included in the cost information. Determiner 103 determines terminal 400 (that is, terminal 400 capable of performing the low cost communication) which transmits the UL data in the communication area and the transmission time in which the low cost communication is possible.

In addition, determiner 103 determines whether the radio quality indicated in the quality information is equal to or greater than the threshold value (whether the radio quality is good) for terminal 400 capable of performing the low cost communication. Then, determiner 103 determines terminal 400 which has the good radio quality and can perform the low cost communication as a terminal which transmits the UL data.

Determiner 103 outputs to communicator 104 the transmission instruction of the UL data to terminal 400 determined as a terminal which transmits the UL data. In addition, as a control signal for terminal 400 other than terminal 400 determined as a terminal which transmits the UL data, determiner 103 outputs to communicator 104 an instruction (packet retention instruction) to retain a packet for a certain period or an instruction (discard instruction) to discard a packet.

Communicator 104 transmits the transmission instruction or the packet retention/discard instruction output from determiner 103 to target terminal 400 via core NW node 200 (GW 203) and base station 300. In addition, communicator 104 receives the UL data (environmental information, and/or the like) transmitted from the communication area capable of performing the low cost communication from terminal 400 which is a transmission destination of the transmission instruction via core NW node 200 (GW 203) and base station 300 and outputs the received UL data to, for example, a processing section (not illustrated) related to the ITS service.

Here, the case where ITS server 100 determines terminal 400 capable of performing the low cost communication for the communication area and the transmission time in which the communication cost is low has been described. However, the present invention is not limited to this process, and for example, ITS server 100 may determine terminal 400 capable of performing the low cost communication for either the communication area or the transmission time. For example, ITS server 100 may specify base station 300 having the transmission time in which the low cost communication is possible, and may determine terminal 400 capable of performing communication at the transmission time in specified base station 300.

[Configuration of Terminal]

Figure 3:
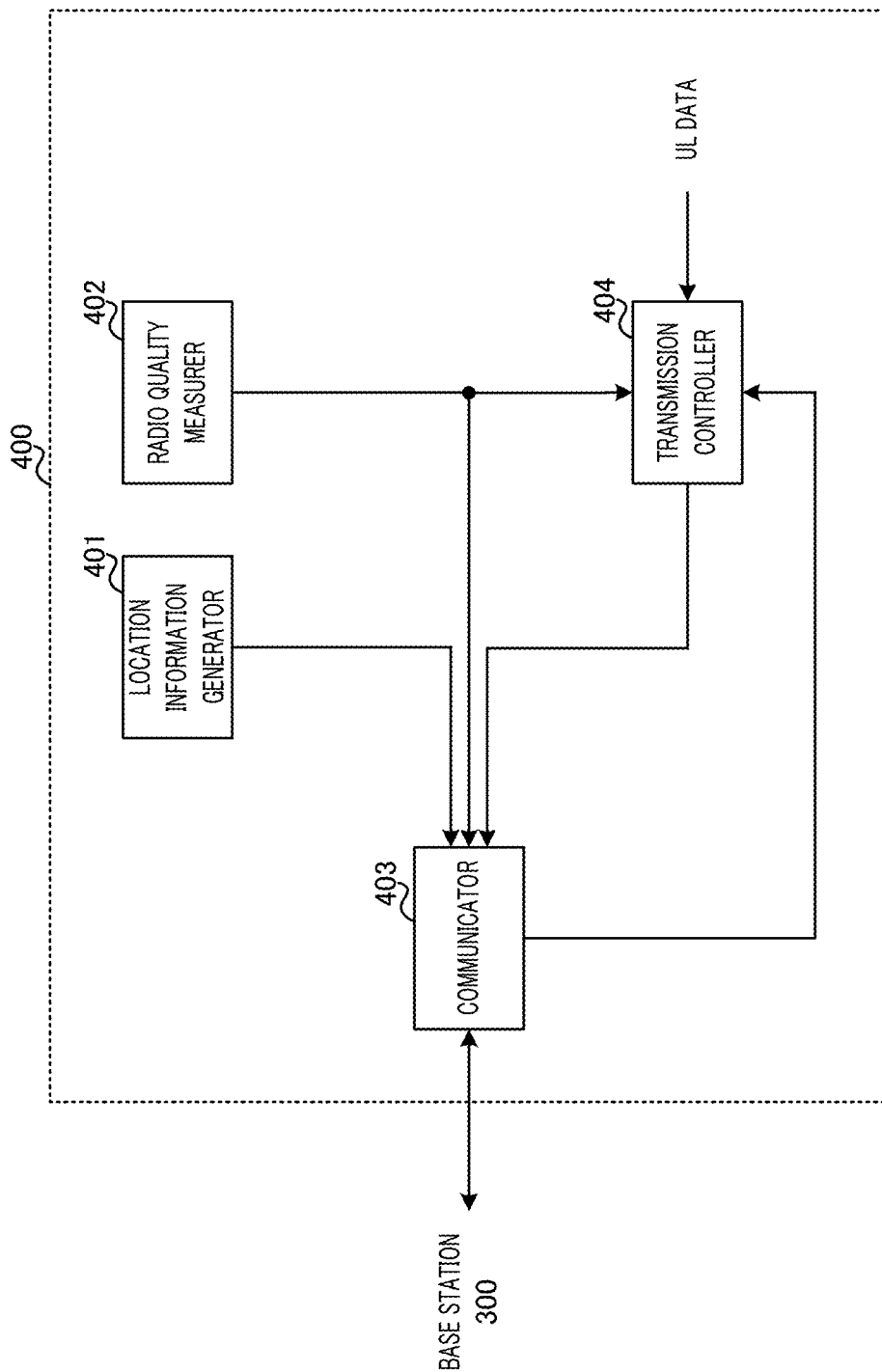
FIG. 3 is a block diagram illustrating a configuration example of a terminal according to an embodiment.

FIG. 3 is a diagram illustrating a configuration example of terminal 400 according to the present embodiment. Terminal 400 illustrated in FIG. 3 adopts a configuration including location information generator 401, radio quality measurer 402, communicator 403, and transmission controller 404.

Location information generator 401 generates location information indicating a location of the terminal 400. For example, location information generator 401 may position a location of the terminal 400 by global positioning system (GPS) and/or the like and generate location information indicating the positioning result. Alternatively, location information generator 401 may use as the location information (for example, a cell ID, a tracking area (TA), a TA list, and/or the like) indicating a visited area in which the terminal 400 is present. Alternatively, location information generator 401 may acquire information indicating a traveling location (or scheduled traveling location) of a vehicle from a car navigation system of the vehicle on which terminal 400 is mounted, and may specify the acquired information as the location information. Location information generator 401 outputs the location information to communicator 403.

Radio quality measurer 402 measures the radio quality between the terminal 400 and base station 300 to which the terminal 400 is connected. Examples of the radio quality include received power, a received signal strength indicator (RSSI), reference signal received power (RSRP), a signal to interference and noise ratio (SINR), reference signal received quality (RSRQ), and/or the like. Radio quality measurer 402 outputs the quality information indicating the measured radio quality to communicator 403.

Communicator 403 transmits the location information input from location information generator 401 and the quality information input from radio quality measurer 402 to base station 300. Further, communicator 403 receives the transmission instruction from ITS server 100 or the packet retention/discard instruction, and outputs the transmission instruction to transmission controller 404. In addition, communicator 403 transmits a control signal (for example, a scheduling request or BSR) or UL data output from transmission controller 404 to base station 300. In addition, when receiving the resource allocation information from base station 300, communicator 403 transmits the UL data output from transmission controller 404 to base station 300 using the resources indicated in the resource allocation information.

Transmission controller 404 controls the transmission of the UL data according to the instruction (transmission instruction, packet retention/discard instruction) from ITS server 100 input from communicator 403. Specifically, when the transmission instruction is input, transmission controller 404 outputs a resource allocation request (scheduling request or BSR) for base station 300 to communicator 403, and outputs the UL data to communicator 403. On the other hand, if the packet retention instruction is input, transmission controller 404 retains the UL data for a certain period, and discards the UL data when not receiving the transmission instruction until a certain period has elapsed. In addition, when the packet discard instruction is input, transmission controller 404 discards the UL data.

[Operation Example of Communication System]

Next, the communication control performed by each apparatus of the above-described communication system will be described in detail.

Hereinafter, (i) the method of acquiring cost information and terminal information performed by ITS server 100, (ii) the method of controlling transmission of UL data performed by ITS server 100, and (iii) in the cost information used by ITS server 100, the relationship between the location of terminal 400 and the communication cost will be described in detail.

[(i) Method of Acquiring Cost Information and Terminal Information]

First, the method of acquiring cost information and terminal information performed by ITS server 100 will be described.

Figure 4:
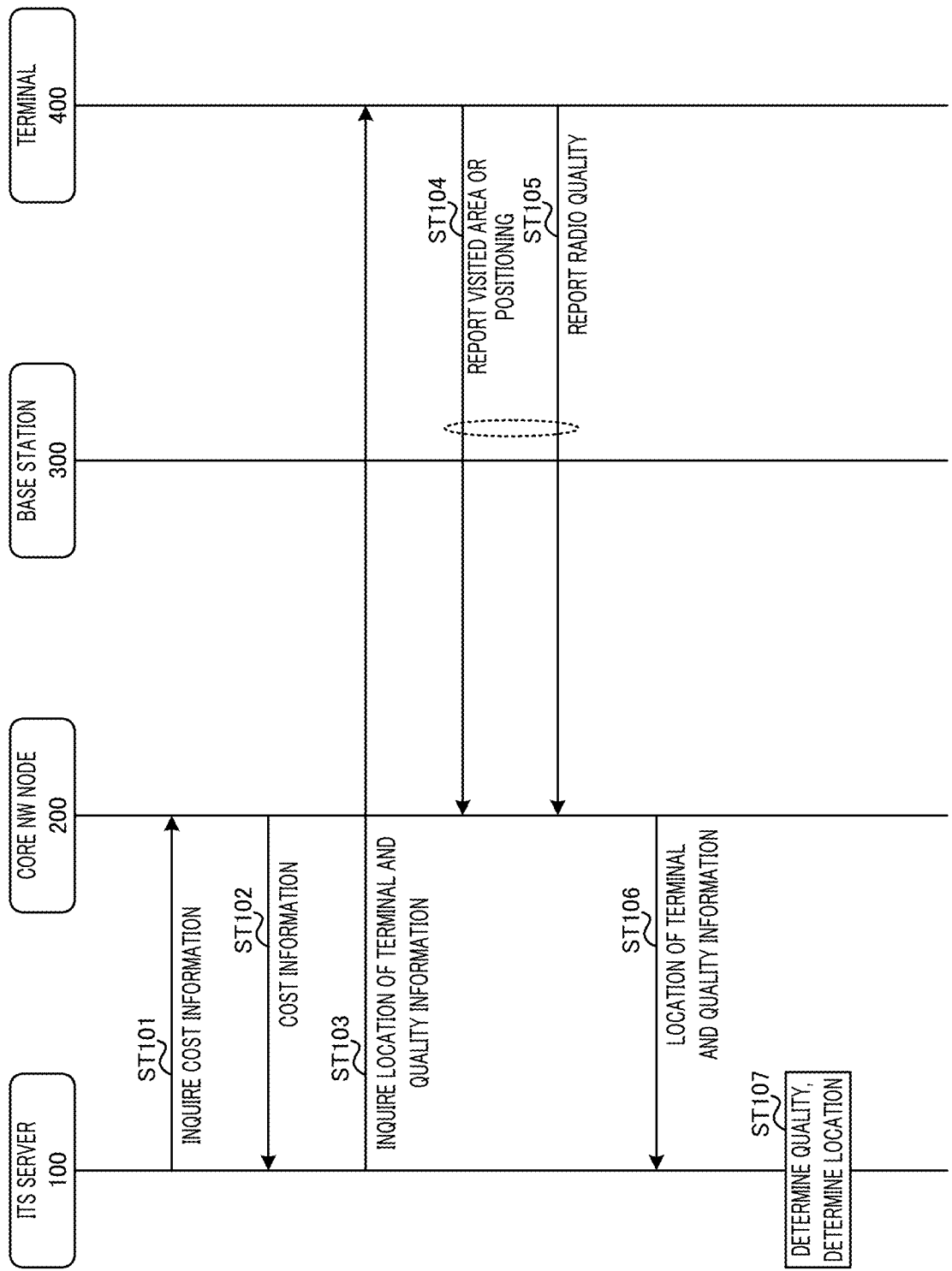
FIG. 4 is a diagram illustrating an example of a method of acquiring cost information and terminal information according to an embodiment.

FIG. 4 is a diagram illustrating an operation example of the communication system when ITS server 100 acquires the cost information and the terminal information.

In FIG. 4, in ST101, ITS server 100 transmits the signaling for inquiring the cost information to core NW node 200 (for example, billing server 202).

In ST102, when receiving the signaling for inquiring the cost information from ITS server 100, core NW node 200 transmits the retained cost information to ITS server 100.

Next, in ST103, ITS server 100 transmits to terminal 400 the signaling for inquiring the location information or the quality information of terminal 400.

In ST104, when receiving the signaling for inquiring the location information from ITS server 100, terminal 400 reports the location information (for example, the visited area or the positioning result) indicating the location of terminal 400 to core NW node 200.

In ST105, when receiving the signaling for inquiring the quality information from ITS server 100, terminal 400 reports the location information indicating the radio quality of terminal 400 to core NW node 200.

In ST106, core NW node 200 transmits the terminal information including the location information and the quality information of terminal 400 reported in ST104 and ST105 to ITS server 100.

In this way, in FIG. 4, the reporting of the location information and the quality information in ST104 and ST105 is performed based on the inquiry from ITS server 100.

In FIG. 4, a time-series order of the inquiry operation of the cost information (ST101 and ST102) and the inquiry operation of the terminal information (ST103 to ST106) is not particularly limited. ITS server 100 may inquire in order of the terminal information and the cost information or may inquire both the cost information and the terminal information at the same time.

In ST107, based on the cost information acquired in ST102 and the terminal information (location information and quality information) acquired in ST106, ITS server 100 determines whether there is terminal 400 where the UL data can be transmitted in the communication area in which the low cost communication is possible (position determination). In addition, in the cost information, when the communication cost is associated with the combination of the communication area in which the communication cost is low and the transmission time in the communication area, ITS server 100 may determine whether there is terminal 400 capable of transmitting the UL data in the combination of the communication area and the transmission time in which the low cost communication is possible.

In addition, ITS server 100 determines whether the radio quality of terminal 400 is good based on the quality information acquired in ST106 (quality determination).

In this way, ITS server 100 determines terminal 400 which transmits the UL data in the communication area or the transmission time (the communication area or the transmission time in which the communication cost is less than the threshold value) in which the low cost communication is possible.

ITS server 100 instructs terminal 400 which transmits the UL data to transmit the UL data in the communication area or the transmission time in which the low cost communication is possible (details will be described later). For example, ITS server 100 may transmit a transmission instruction, which instructs an immediate transmission of the UL data, to terminal 400 to be transmitted in the communication area of the transmission time in which the UL data are transmitted to terminal 400. Alternatively, when transmitting the transmission instruction to terminal 400, ITS server 100 may instruct the communication area or the transmission time in which the UL data are transmitted to terminal 400.

On the other hand, ITS server 100 instructs terminal 400 having poor radio quality or terminal 400 which cannot transmit the UL data in the communication area and the transmission time capable of performing the low cost communication to wait for the transmission of the UL data or discard the UL data (details will be described later).

In this way, based on the cost information, the location information, and the quality information of terminal 400, ITS server 100 determines the communication area and the transmission time (timing) in which terminal 400 transmitting the UL data and terminal 400 transmitting the UL data communicate with each other. By this process, terminal 400 can transmit the UL data at the low cost and with the good radio quality.

In addition, ITS server 100 predicts a position where terminal 400 is to be move in the future, and may determine terminal 400 that transmits the UL data in the communication area in which the low cost communication is possible based on the location of the movement destination of terminal 400. For example, ITS server 100 may predict a future location of terminal 400 using a traveling plan in a car navigation system of the vehicle on which terminal 400 is mounted as the location information. When there is terminal 400 capable of transmitting the UL data in the communication area in which the low cost communication is possible, ITS server 100 may secure (reserve) the transmission opportunity of the UL data to terminal 400. By this process, ITS server 100 can more flexibly control the transmission of the UL data in the low cost communication by using not only the current location of terminal 400 but also the location to be moved in the future.

[Another Method of Acquiring Cost Information and Terminal Information]

In FIG. 4, the case where the location information and the quality information are reported in response to an inquiry from ITS server 100 to terminal 400 will be described. However, the method of reporting location information and quality information is not limited to this process. For example, terminal 400 may report the location information and the quality information to core NW node 200 at a predetermined timing or periodically, irrespective of the inquiry from ITS server 100.

Figure 5:
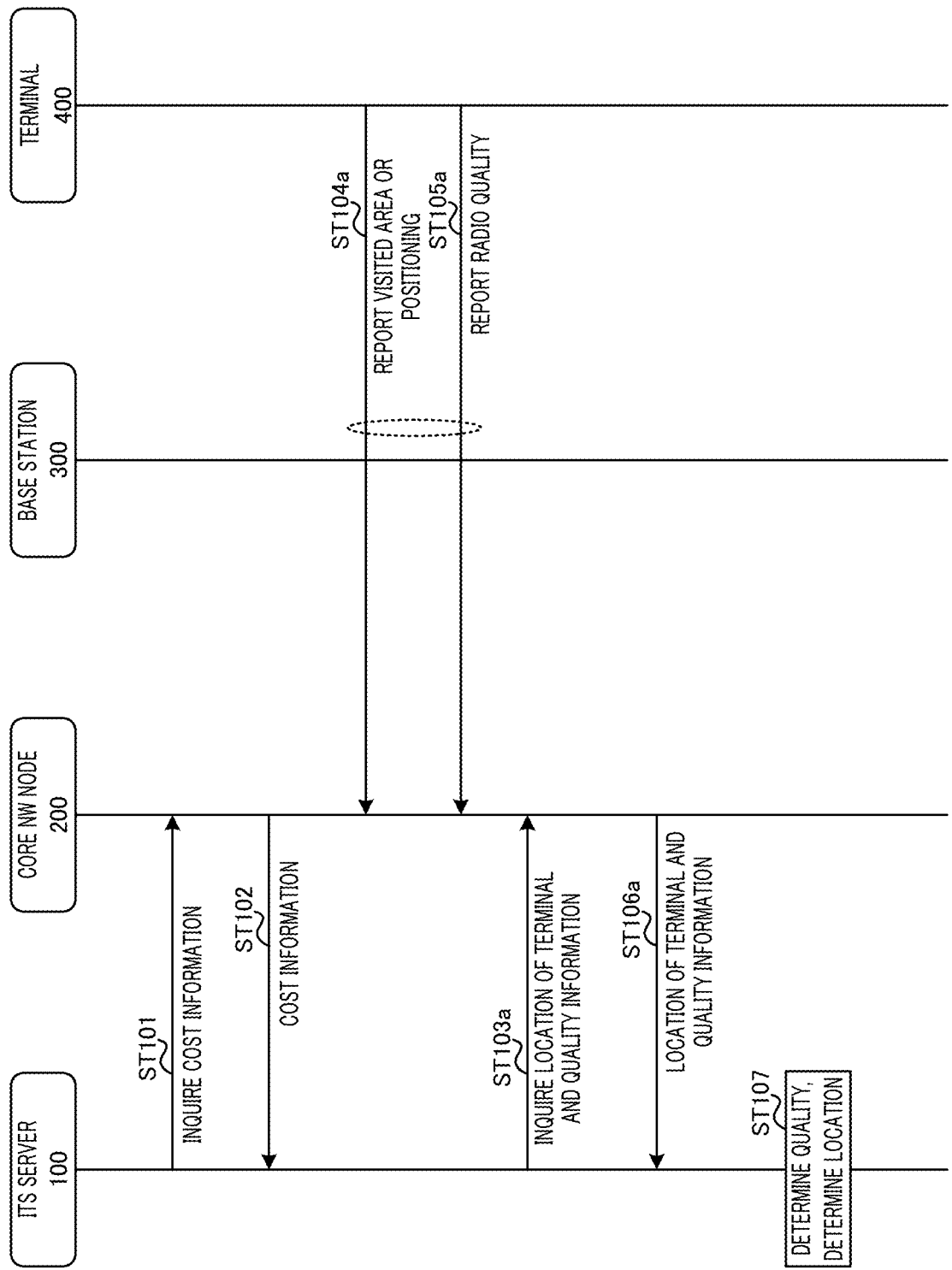
FIG. 5 is a diagram illustrating another example of the method of acquiring cost information and terminal information according to an embodiment.

FIG. 5 is a diagram illustrating an operation example of the communication system in the case where terminal 400 reports the location information and the quality information at the predetermined timing. In FIG. 5, the same reference numerals are given to the same processes as those in FIG. 4, and description thereof is omitted.

In FIG. 5, in ST104*a* and ST105*a*, terminal 400 reports the location information and the quality information to core NW node 200 at the predetermined timing independent of the inquiry of ITS server 100. Core NW node 200 manages the location information and the quality information reported from each terminal 400.

For example, among the plurality of terminals 400, terminal 400 (terminal 400 which is a cost reduction target) for which low cost communication is required may compare with terminal 400 which is a cost reduction target to report the location information (for example, a visited area) or the quality information to core NW node 200 in a narrow area or very frequently. ITS server 100 can acquire more accurate location information or quality information of terminal 400 by allowing terminal 400 which is the cost reduction target to report the location information or the quality information in a narrow area. In addition, as terminal 400 which is the cost reduction target very frequently reports the location information or the quality information, ITS server 100 can acquire the location information or the quality information reflecting the current condition of terminal 400, and the accuracy of the transmission control of the UL data can be improved.

Next, in ST103*a*, ITS server 100 transmits to core NW node 200 the signaling for inquiring the location information or the quality information of terminal 400. In ST106*a*, when receiving the signaling for inquiring the location information or the quality information from ITS server 100, core NW node 200 transmits the retained location information or quality information to ITS server 100.

It should be noted that core NW node 200 may transmit the terminal information to ITS server 100 at the predetermined timing without being limited to the time of inquiry from ITS server 100. For example, core NW node 200 may transmit the terminal information to ITS server 100 every time the location information of terminal 400 is registered in location registration server 201, or may transmit the terminal information of terminal 400 which is a target for the low cost communication to ITS server 100 periodically.

[(ii) Transmission Control Method of UL Data]

Next, a method of controlling transmission of UL data to terminal 400 by ITS server 100 will be described.

As described above, ITS server 100 notifies the higher layer of terminal 400 of the transmission control result (transmission instruction or transmission waiting/discard instruction) of the UL data based on the cost information and the terminal information as described above. Terminal 400 determines whether to pass the UL data (transmission packet) to the lower layer based on the instruction from ITS server 100 in the higher layer.

When notifying the transmission control result of the UL data from ITS server 100, the case in which terminal 400 is in a state (Connected state) of being connected (accessing) to base station 300 and the case in which terminal 400 is in a state (Idle state) of not being connected to base station 300 are assumed.

Hereinafter, each operation of each Connected state of terminal 400 will be described.

<When Terminal 400 is in Connected State>

First, the case where terminal 400 is in the Connected state will be described.

(Control Method 1)

Figure 6A:
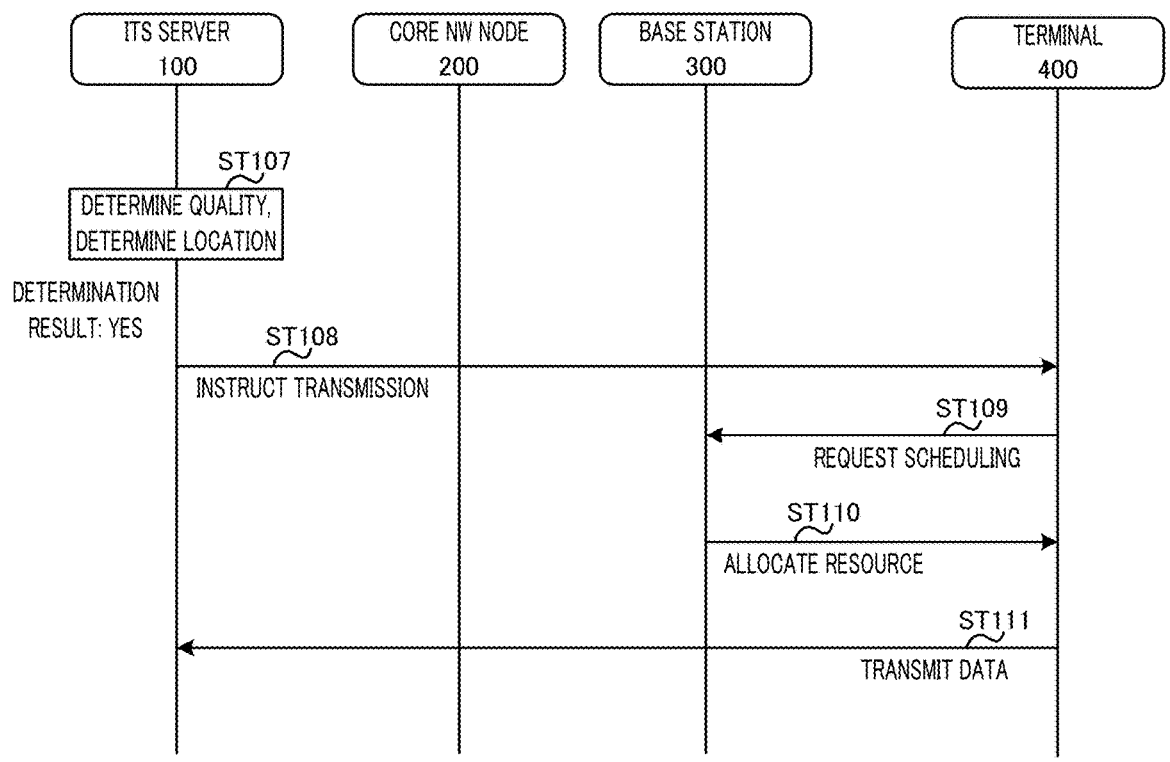
FIG. 6A is a diagram illustrating an example of a method of controlling transmission of UL data according to an embodiment.
Figure 6B:
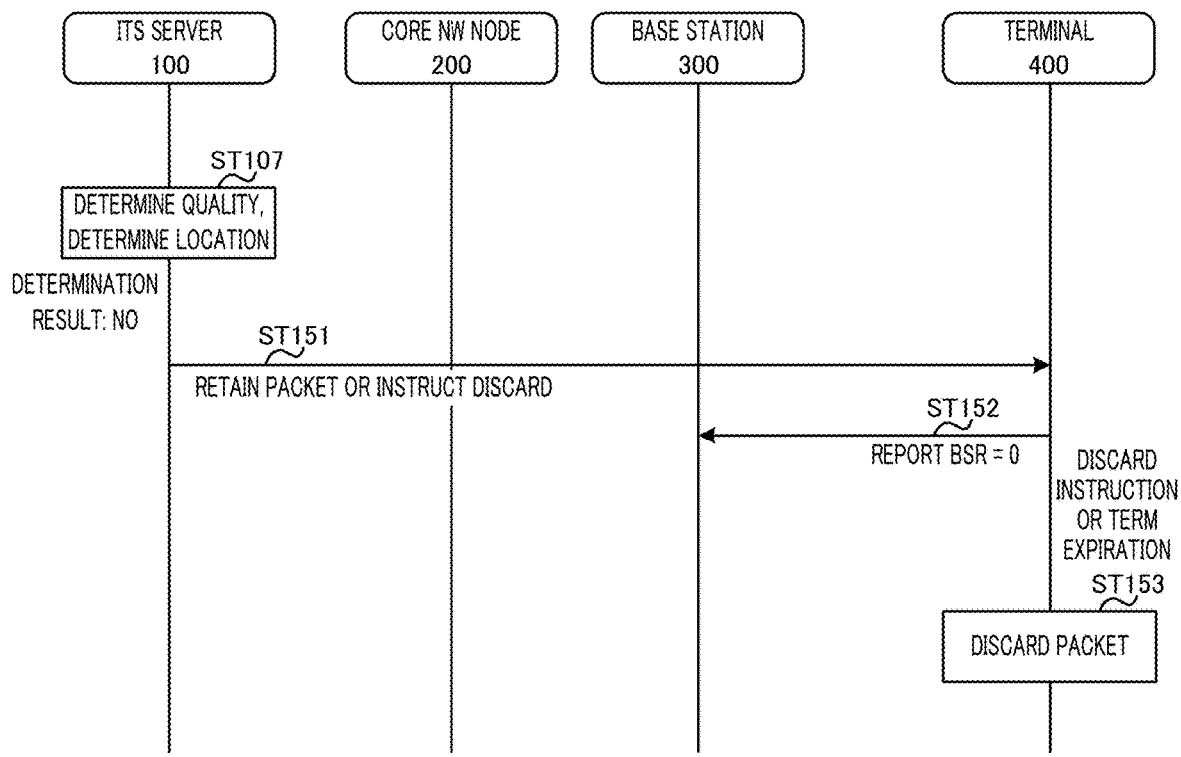
FIG. 6B is a diagram illustrating an example of a method of controlling a retention instruction or a discard instruction of UL data according to an embodiment.

FIGS. 6A and 6B are diagrams illustrating an example of the transmission control of the UL data when terminal 400 is in the Connected state. In FIGS. 6A and 6B, the same reference numerals are given to the same processes as those in FIG. 4 or FIG. 5, and description thereof is omitted.

FIG. 6A illustrates an operation example of ITS server 100 when it is determined that terminal 400 is a terminal capable of performing the low cost communication (determination result in ST107: YES).

In FIG. 6A, in ST108, ITS server 100 notifies terminal 400 of the transmission instruction of the UL data.

When receiving the transmission instruction of the UL data, terminal 400 transmits a scheduling request for the UL data to base station 300 in ST109.

In ST110, base station 300 allocates the UL resource to terminal 400 based on the scheduling request from terminal 400, and transmits the resource allocation information to terminal 400.

In ST111, terminal 400 transmits the UL data to ITS server 100 using the UL resource allocated from base station 300.

On the other hand, FIG. 6B illustrates an operation example of ITS server 100 when it is determined that terminal 400 is a terminal capable of performing the low cost communication (determination result in ST107: No).

In FIG. 6B, in ST151, ITS server 100 notifies terminal 400 of the retention (waiting) or discard instruction of the UL data (packet).

When receiving the retention instruction of the packet or the discard instruction of the packet from ITS server 100, terminal 400 does not perform the process of transmitting the UL data. Specifically, terminal 400 does not transmit the UL data scheduling request to base station 300. In addition, terminal 400 sets a value of BSR to 0 and reports to base station 300 that there is no UL data to be transmitted (ST152). Terminal 400 may not report the BSR to base station 300.

In addition, when being instructed to retain the packet, terminal 400 retains the UL data for a certain period (waits for transmission). It should be noted that terminal 400 may transmit the UL data in the same manner as in FIG. 6A when receiving the transmission instruction while retaining the UL data (waiting for transmission) (ST109 to ST111).

Terminal 400 discards the UL data (packet) in the case where a certain period of time has elapsed (for example at the time of expiration of the timer) after being instructed to retain the packet or in the case where being instructed to discard the packet (ST153).

In this way, according to the control method 1, ITS server 100 can collect the UL data from only terminal 400 present in the communication area in which the low cost communication is possible, and reduce the communication cost at each terminal 400.

(Control Method 2)

In the control method 1 (FIG. 6A), the case where when receiving the transmission instruction from ITS server 100, terminal 400 passes the packet from the higher layer to the lower layer unconditionally has been described. On the other hand, in the control method 2, if receiving the transmission instruction from ITS server 100, terminal 400 passes the packet from the higher layer to the lower layer when the predetermined condition is satisfied.

Figure 7A:
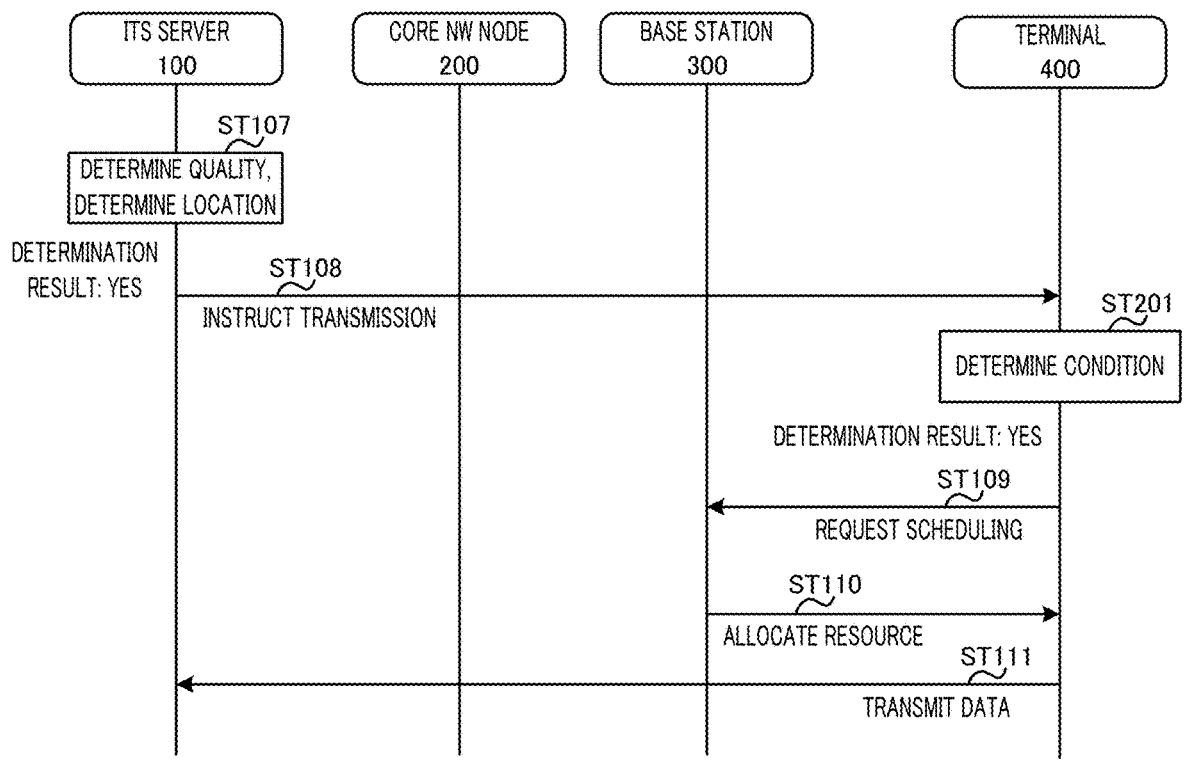
FIG. 7A is a diagram illustrating an example of a method of controlling transmission of UL data according to an embodiment.
Figure 7B:
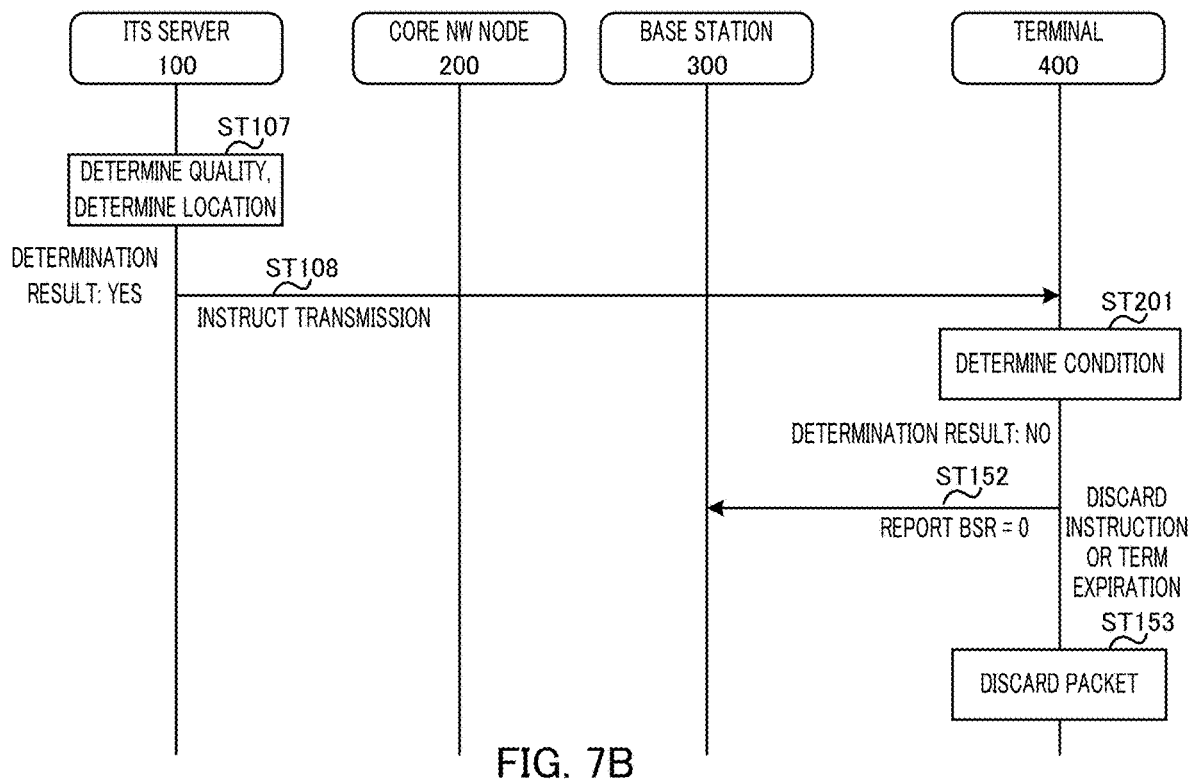
FIG. 7B is a diagram illustrating another example of the method of controlling transmission of UL data according to an embodiment.

FIGS. 7A and 7B are diagrams illustrating an example of the transmission control of the UL data in the case where the transmission instruction is received when terminal 400 is in the Connected state. In FIGS. 7A and 7B, the same reference numerals are given to the same processes as those in FIGS. 4 and 5 or FIGS. 6A and 6B, and description thereof is omitted.

In addition, in the control method 2, when terminal 400 is in the Connected state, the operation when terminal 400 receives the packet retention/discard instruction is the same as that in the control method 1 (FIG. 6B), and therefore, the description thereof is omitted.

In FIGS. 7A and 7B, in ST201, when receiving the transmission instruction, terminal 400 determines whether the predetermined condition is satisfied.

Examples of the predetermined conditions include that the radio quality of terminal 400 is equal to or greater than a predetermined threshold value (the radio quality is good), the location of terminal 400 is within the area in which the low cost communication is possible, and base station 300 (connected cell) to which terminal 400 is connected covers the area in which the low cost communication is possible, or a combination thereof. That is, when receiving the transmission instruction, terminal 400 again determines whether the current state of terminal 400 is in a state capable of performing the low cost communication.

It should be noted that the threshold value used upon judging whether terminal 400 satisfies the predetermined condition may be distributed in advance from ITS server 100 or may be distributed from base station 300 according to the higher layer signaling (including broadcast signaling).

When the predetermined condition is satisfied (determination result of ST201 illustrated in FIG. 7A: YES), terminal 400 transmits the UL data in the same manner as the operation illustrated in FIG. 6A (ST109 to ST111). Meanwhile, when the predetermined condition is satisfied (determination result of ST201 illustrated in FIG. 7B: NO), terminal 400 retains or discards the UL data in the same manner as in FIG. 6B (ST152 to ST153).

It should be noted that in FIG. 7B, terminal 400 may transmit the UL data in the same manner as in FIG. 7A when the predetermined condition is satisfied while retaining the UL data (during transmission waiting).

In this way, in the control method 2, terminal 400 transmits the UL data only when the predetermined condition is satisfied at the timing when terminal 400 receives the transmission instruction. For example, it is assumed that a difference occurs between the terminal information used when ITS server 100 determines the transmission instruction of the UL data to terminal 400 and the current terminal information of terminal 400. That is, it is also assumed that terminal 400 is transitioning to a state in which transmission of UL data cannot be realized at a low cost. On the other hand, according to the control method 2, terminal 400 again determines whether the predetermined condition is satisfied (that is, whether the low cost communication is possible) after receiving the transmission instruction, so that is possible to prevent the high cost communication from being performed unintentionally.

It should be noted that the timing of judging whether terminal 400 satisfies the predetermined condition in the control method 2 is not limited to the timing before passing the packet from the higher layer to the lower layer and may be timing even after passing the packet from the higher layer to the lower layer. By this configuration, even when the state of terminal 400 transitions to the state which does not satisfy the predetermined condition after passing the packet from the higher layer to the lower layer, it is possible to avoid the transmission of the UL data. By this process, it is possible to prevent terminal 400 from being performed in the high cost communication.

<When Terminal 400 is in Idle State>

Next, the case where terminal 400 is in the Idle state will be described.

When terminal 400 is in the Idle state, terminal 400 transitions to the Connected state to transmits the UL data. As the condition for transitioning from the Idle state to the Connected state, there is a case where the process in terminal 400 is triggered (hereinafter, referred to as terminal trigger) and a case where the downlink (DL) reception process is triggered (hereinafter, referred to as DL reception trigger").

(UL Transmission Based on Terminal Trigger Condition)

The conditions for transitioning to the Connected state by the terminal trigger may include the following methods (1)

to (4). Terminal 400 determines whether to transition from the Idle state to the Connected state according to the following conditions.

(1) Terminal 400 transitions from the Idle state to the Connected state by setting as the trigger the fact that the packet is passed from the higher layer to the lower layer.

(2) Terminal 400 transition from the Idle state to the Connected state by setting as the trigger the fact that the connection from the higher layer to base station 300 is instructed.

(3) Terminal 400 transitions from the Idle state to the Connected state by setting as the trigger a random access channel (RACH) transmission is performed in the case where the reception quality (for example, RSSI, RSRP, RSRQ) is equal to or greater than the predetermined threshold value.

(4) Terminal 400 determines whether to transition from the Idle state to the Connected state based on the broadcast information from base station 300.

Here, the access control using the broadcast information performed by base station 300 is performed in accordance with the connection control (for example, random access control) to base station 300 or the resource allocation request (for example, scheduling request, BSR and/or the like) for each transmission packet (or for each logical channel) within terminal 400.

Figure 8:
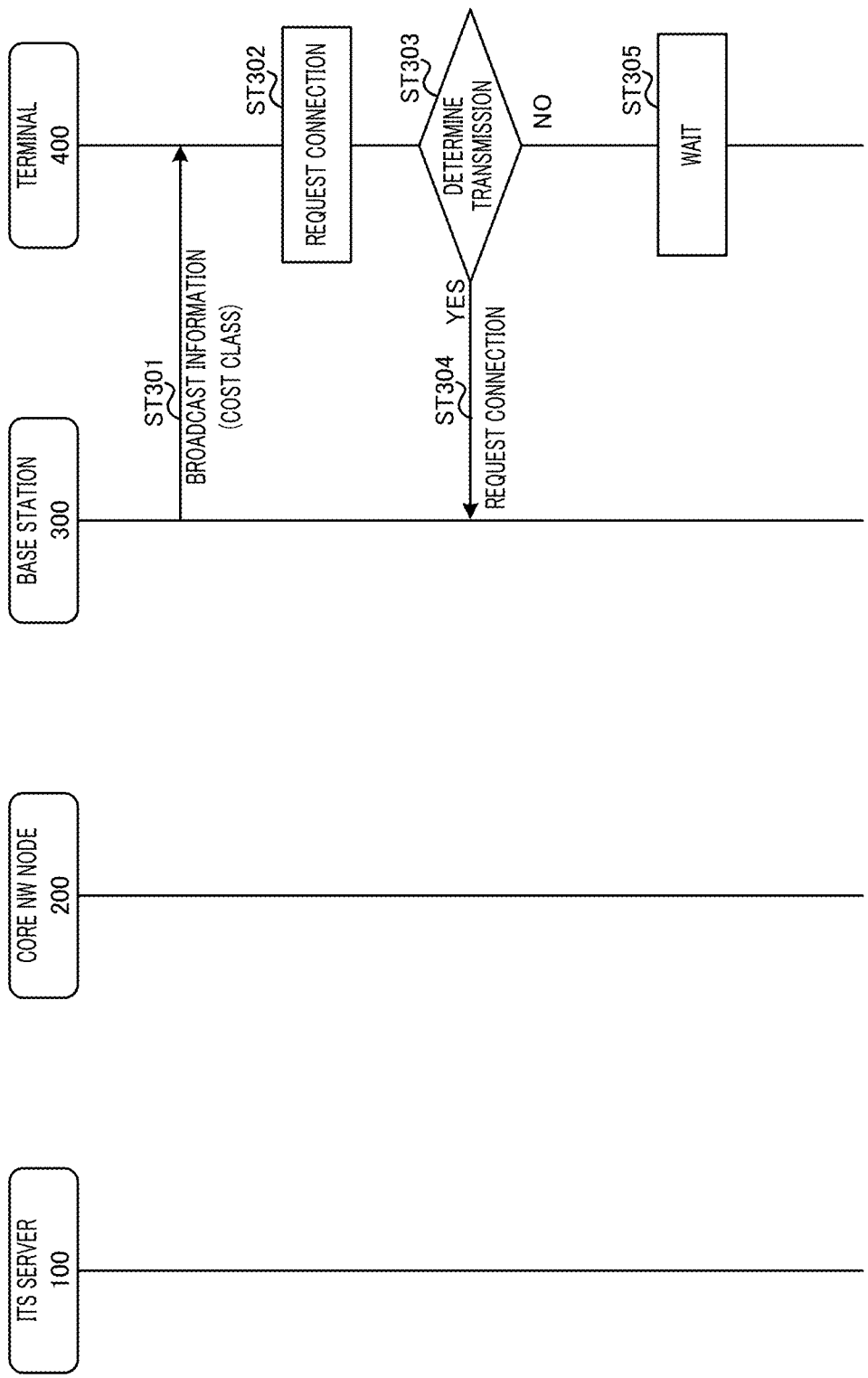
FIG. 8 is a diagram illustrating an example of a method of transitioning from an Idle state to a Connected state according to an embodiment.

FIG. 8 is a diagram illustrating an operation example of base station 300 and terminal 400 in the method (4).

In FIG. 8, in ST301, base station 300 broadcasts (notifies) the broadcast information to terminal 400. Here, the broadcast information includes, for example, a cost class of base station 300 or connection control information on the cost class. Base station 300 may broadcast terminal 400 of different cost classes according to the communication environment of base station 300. That is, the cost class broadcast to terminal 400 fluctuates.

In ST302, the UL data to be transmitted is generated in terminal 400, and terminal 400 generates a connection request to base station 300.

In ST303, terminal 400 determines whether to transmit the connection request generated in ST302 to base station 300 according to the broadcast information (cost class and connection control information) received in ST301. For example, when the broadcast cost class is within the allowable communication cost range, terminal 400 determines that the connection request can be transmitted (ST303: YES), and transmits the connection request to base station 300 in ST304.

On the other hand, if the broadcast cost class is higher than the allowable communication cost, terminal 400 determines that the connection request cannot be transmitted (ST303: NO), and waits for the transmission of the connection request in ST305. When terminal 400 receives the broadcast information in the same manner as in ST301 while waiting for the transmission of the connection request, terminal 400 may again determine whether to transmit the connection request in the same manner as in ST302 according to a new cost class indicated in the broadcast information.

In this way, in the method (4), terminal 400 determines whether to transmit the connection request based on the cost class. By this process, terminal 400 transmits the connection request in the case where the low cost communication is possible, transitions to the Connected state, and then transmits the UL data to ITS server 100 at a low cost via base station 300 having an area in which the communication cost is low.

In the transmission determination (ST303) of the method (4), terminal 400 may determine whether to transmit the connection request to base station 300 based on transmission probability set by the broadcast information instead of the cost class. For example, terminal 400 may generate a random number and compare the random number with the transmission probability, thereby judging whether to transmit the connection request.

In addition, base station 300 may notify the connection control information on a cost class basis by using the broadcast information.

In addition, base station 300 may associate some or all of the existing access classes with the cost class and may notify the access class as the broadcast information. Terminal 400 may determine whether to transmit the connection request based on the cost class associated with the received access class. By this process, signaling for broadcasting the cost class becomes unnecessary. In addition, in this case, the cost class (access class) retained by terminal 400 is not steady, but is changed according to the conditions (for example, time, location of terminal 400, connection state, and/or the like).

In addition, in terminal 400, a plurality of cost classes may be validated. In addition, the cost class may be associated (mapped) with a packet, a logical connection or a logical channel.

In the above description, the conditions for transitioning to the Connected state by the terminal trigger have been described.

In this way, in the terminal trigger, terminal 400 determines whether to transmit the connection request based on the cost class. By this process, terminal 400 transitions to the Connected state and then can transmit the UL data to ITS server 100 at a low cost via base station 300 having an area in which the communication cost is low.

(UL Transmission Based on DL Reception Trigger Condition)

The conditions for transitioning to the Connected state by a DL reception trigger may include the following methods. In accordance with the following conditions, terminal 400 transits from the Idle state to the Connected state.

Specifically, among the plurality of base stations 300, a base station transmitting Paging (hereinafter referred to as a Paging transmission base station) is selected based on communication cost in addition to a location registration area of terminal 400. Specifically, base station 300 having an area with a low communication cost (for example, minimum communication cost) is selected from base stations 300 which can connected to terminal 400.

The Paging transmission base station transmits Paging to terminal 400. Terminal 400 transitions from the Idle state to the Connected state by setting the reception of the Paging as a trigger.

Here, examples of a method of determining base station 300 transmitting Paging to terminal 400 as a Paging transmission base station include the following methods (1) and (2).

(1): Determination Method Performed by Core NW Node 200

Figure 9:
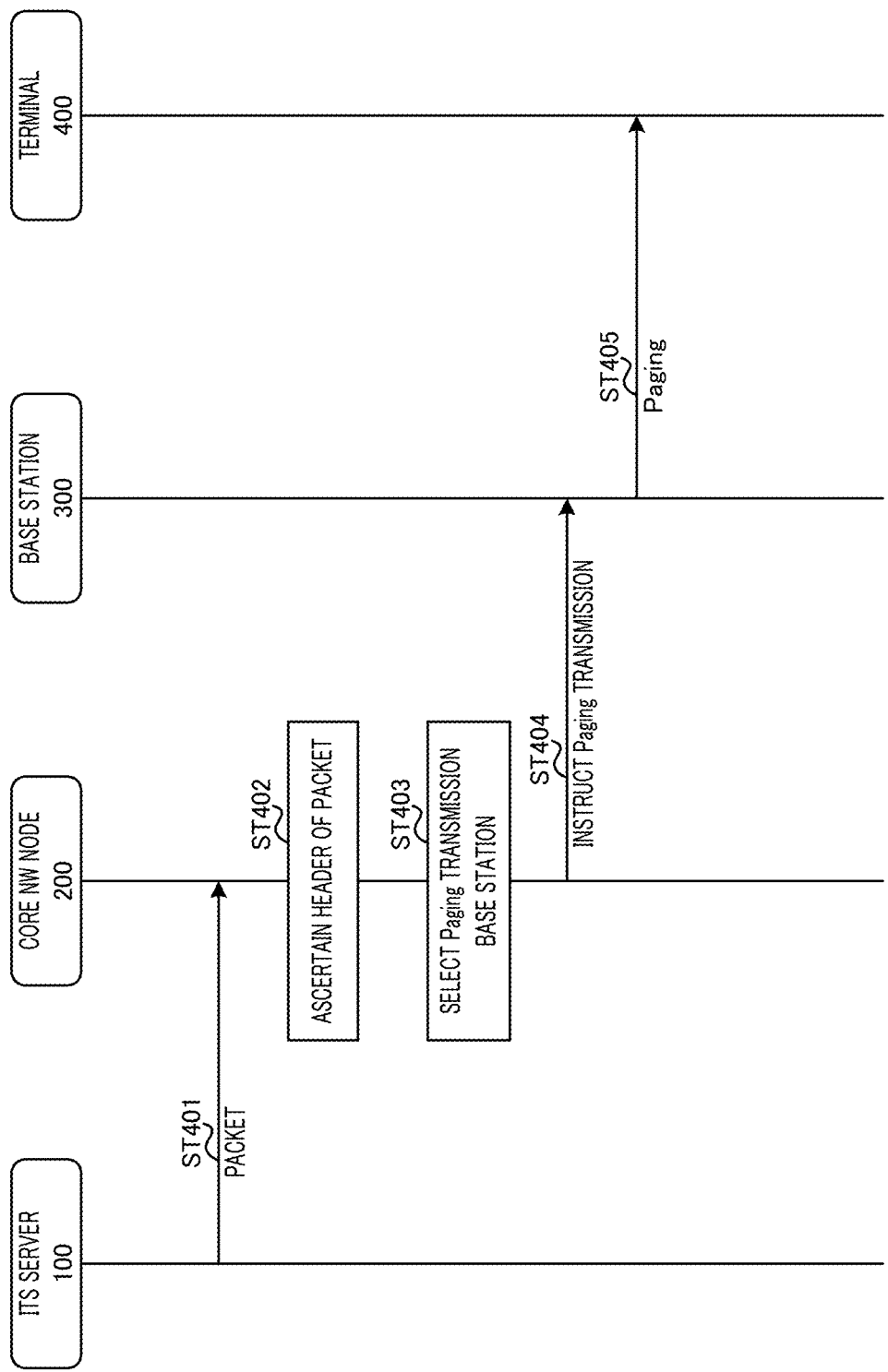
FIG. 9 is a diagram illustrating another example of the method of transitioning from an Idle state to a Connected state according to an embodiment.

FIG. 9 is a diagram illustrating a method of determining a Paging transmission base station in the determining method (1).

In FIG. 9, in ST401, ITS server 100 transmits a packet of a higher layer (for example, IP layer) to core NW node 200. A header of this packet includes the cost information on the communication cost in the plurality of base stations 300.

In ST402, core NW node 200 ascertains the header of the packet from ITS server 100 to specify the cost information (for example, cost class) of the plurality of base stations 300 which can connected to terminal 400.

In ST403, core NW node 200 selects the Paging transmission base station from the plurality of base stations 300 based on the cost information. For example, core NW node 200 may select base station 300 whose cost class satisfies the predetermined conditions (the communication cost is less than the predetermined threshold) as the Paging transmission base station.

In ST404, core NW node 200 instructs base station 300 selected as the Paging transmission base station to transmit Paging to terminal 400.

In ST405, base station 300 (Paging transmission base station) having received the Paging transmission instruction transmits the Paging to terminal 400. When receiving the Paging, terminal 400 transitions from the Idle state to the Connected state.

(2): Determination Method Performed by Base Station 300

Figure 10:
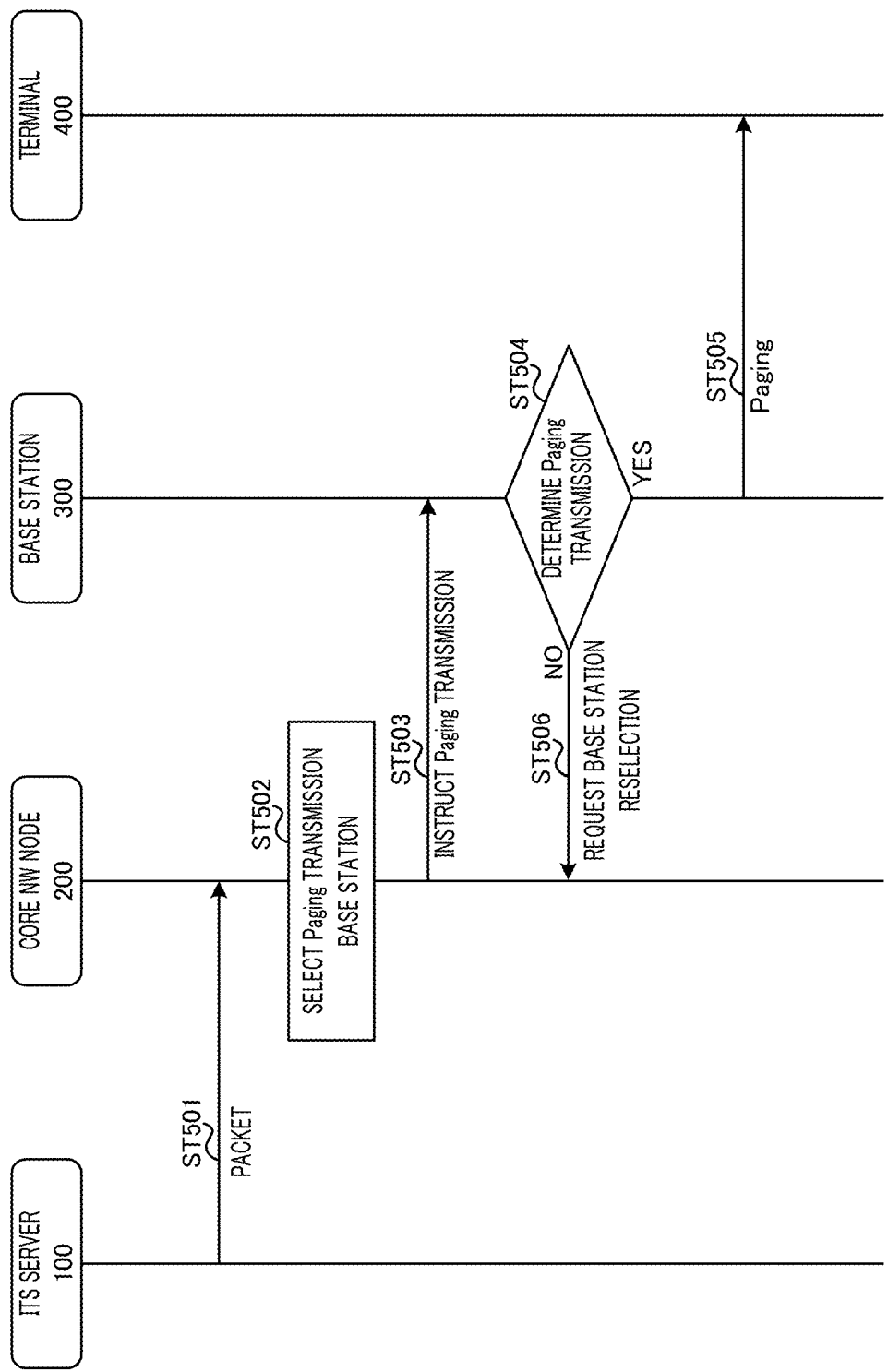
FIG. 10 is a diagram illustrating still another example of the method of transitioning from an Idle state to a Connected state according to an embodiment.

FIG. 10 is a diagram illustrating a method of determining a Paging transmission base station in the determining method (2).

In FIG. 10, in ST501, ITS server 100 transmits a packet to core NW node 200.

In ST502, core NW node 200 selects a Paging transmission base station (candidate) from a plurality of base stations 300, for example, based on the location registration area of terminal 400 of a transmission destination of the packet received from ITS server 100.

In ST503, core NW node 200 instructs base station 300 selected as the Paging transmitting base station to transmit the Paging to terminal 400.

In ST504, base station 300 having received the Paging transmission instruction determines whether to transmit the Paging to terminal 400, for example, based on the cost classes or QoS class identifiers (QCIs) for each logical connection (for example, bearer or PDN connection). For example, base station 300 may determine whether to transmit the Paging to terminal 400 in the case where the cost class of its own station satisfies the predetermined conditions (the communication cost is less than the predetermined threshold value).

If it is determined that the Paging is transmitted (ST504: YES), base station 300 transmits the Paging to terminal 400 in ST505. When receiving the Paging, terminal 400 transitions from the Idle state to the Connected state.

On the other hand, if it is determined that the Paging is not transmitted (ST504: NO), in ST506, base station 300 requests core NW node 200 to reselect the Paging transmission base station (candidate). When receiving the reselection request of the Paging transmission base station, core NW node 200 reselects the Paging transmission base station in the same manner as in ST502, for example.

In the above description, the conditions for transitioning to the Connected state by the DL reception trigger has been described.

In this way, in the DL reception trigger, core NW node 200 or base station 300 selects the Paging transmission base station based on the cost class. By this process, terminal 400 transitions to the Connected state and then can transmit the UL data to ITS server 100 at a low cost via base station 300 having an area in which the communication cost is low.

The above determination methods (1) and (2) may be combined.

[(iii) Relationship Between Location of Terminal 400 and Communication Cost]

Next, the relationship between the communication cost in the cost information used by ITS server 100 and the location of terminal 400 will be described.

Specifically, billing server 202 in core NW node 200 associates the location (communication area) where terminal 400 performs communication with the communication cost (communication fee, and/or the like) of terminal 400 at the location. In addition, billing server 202 may further associate the time when terminal 400 performs communication with the communication cost of terminal 400 at the time.

For example, billing server 202 acquires the location information of terminal 400 by the following method.

(1) Use of Terminal Location Registration

Location registration server 201 notifies billing server 202 of the location registration area of terminal 400. For example, location registration server 201 may notify billing server 202 of the location registration area at timing when the location registration area of terminal 400 is updated or periodically.

(2) Use of Positioning Information

Billing server 202 acquires the location of terminal 400 that terminal 400 has positioned or the location of terminal 400 that is measured by a positioning server (not illustrated). For example, billing server 202 may acquire the location information of terminal 400 from terminal 400 or the positioning server at the timing when the location of terminal 400 is updated or periodically.

By these processes, billing server 202 can manage as the cost information the communication cost by associating the communication cost required for terminal 400 to communicate the UL data with the location where terminal 400 has transmitted the UL data (that is, the communication area of the base station 300) or the time when the terminal 400 has transmitted the UL data. By acquiring the cost information from billing server 202, ITS server 100 can specify the area in which the low cost communication is possible in each base station 300 and the time when the low cost communication is possible. For example, when the location of terminal 400 is changed or when terminal 400 is charged by performing communication, billing server 202 updates the communication cost managed as the cost information, the communication area (the location of terminal 400), and the communication time, so that the accuracy of the cost information can be improved.

It should be noted that billing server 202 is not limited to the case where associating the actually required communication cost itself when associating the location where terminal 400 has transmitted the UL data with the communication cost. For example, it is assumed that billing server 202 reports a predicted location of a moving route of terminal 400 as the location where terminal 400 performs communication. In this case, when the location where terminal 400 actually performs communication and the predicted position are different from each other, billing server 202 may associate a value obtained by adding a predetermined value (penalty) to the actual communication cost with the predicted location. By this process, the communication cost associated with the predicted location becomes higher than the actual communication cost, so that the reliability of the predicted location is decreased, and in ITS server 100, it is difficult to determine that the predicted location is the area in which the low cost communication is possible.

Effect of Embodiment

As described above, ITS server 100 determines terminal 400 which transmits the UL data in the communication area or time in which the low cost communication is possible based on the communication cost in the communication area in which at least one terminal 400 can perform communication and the location of terminal 400. By this process, each terminal 400 can transmit the UL data in the communication area or time in which the communication cost is lower.

As a result, according to the present embodiment, it is possible to communicate the UL data from terminal 400 at a lower cost in the V2X communication.

[Variation 1]

When instructing terminal 400 to transmit UL data, ITS server 100 may notify transmission area information indicating a transmission area in which the UL data can be transmitted. Terminal 400 transmits the UL data only within the area indicated by the transmission area information out of areas in which low cost communication is possible. By this process, it is possible to further limit terminal 400 transmitting the UL data in the area in which the low cost communication is possible and avoid uploading the UL data (same environmental information) from the same area more than necessary.

[Variation 2]

Only arbitrary terminal 400 within the communication area of base station 300 may transmit the UL data. For example, ITS server 100 transmits a transmission instruction to a plurality of terminals 400 by broadcast information, multicast, Paging (Group Paging) to which RNTI is common between a plurality of terminals, and/or the like via base station 300. Each terminal 400 acquires the transmission instruction of the UL data and actually transmits the UL data only when the predetermined conditions are satisfied. The predetermined conditions may be based on, for example, radio quality equal to or greater than a predetermined threshold value and transmission probability.

That is, this process corresponds to notifying the transmission instruction to terminal 400 which transmits the UL data by applying the conditions based on the DL reception trigger described above, and then judging whether to transmit the UL data by applying the conditions based on the terminal trigger described above even within terminal 400.

By this configuration, even when ITS server 100 does not specify the detailed location or the radio quality of terminal 400 (vehicle), ITS server 100 can instruct only terminal 400 capable of performing large-capacity communication at a low cost in a specific area to transmit the UL data. In particular, this is suitable for the case where in order to understand the number of transmission bits, the communication cost is not represented by a bit unit price that needs to specify the location or the radio quality of terminal 400, but the communication cost is represented by a resource size unit price defined only by availability of a resource occupied by V2X communication in base station 300.

[Variation 3]

When a plurality of terminals 400 are present in a specific area, only some of terminals 400 within an area may transmit UL data. That is, ITS server 100 (communicator 104) is located within the communication area in which the low cost communication is possible and receives the UL data from only some of terminals 400 among the plurality of terminals 400 which is a transmission destination of a transmission instruction.

Figure 11:
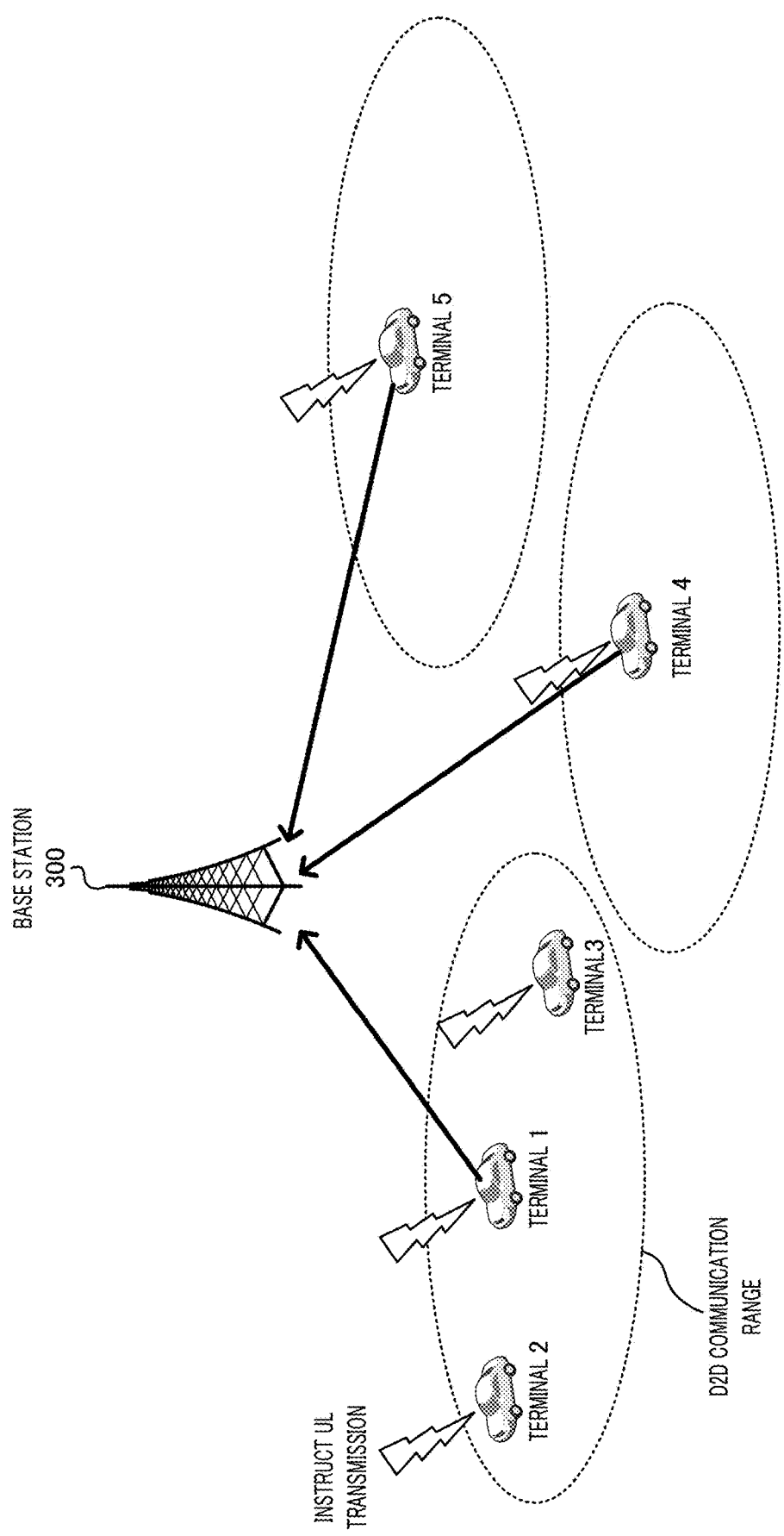
FIG. 11 is a diagram illustrating an example of a method of controlling transmission of UL data according to a variation of an embodiment.

For example, it may be a device to device (D2D) communication (sometimes referred to as side link) range illustrated in FIG. 11 as a specific area. The D2D communication range is an area in which vehicles can directly communicate with each other. In this case, terminal 400 (for example, terminal 1 in FIG. 11) that has transmitted the UL data according to the transmission instruction from ITS server 100 notifies that the UL data are transmitted to other terminals 400 (terminal 2 and terminal 3 in FIG. 11) within the D2D communication range. Other terminals 400 receiving the notification that the UL data are transmitted ignore the transmission instruction from ITS server 100 and do not transmit the UL data.

For example, by including an identifier related to the transmission instruction of the UL data in data to be broadcast in the D2D communication, terminal 400 on a receiving side of the D2D communication can determine whether to transmit the UL data by ascertaining identity between the transmission instruction received by terminal 400 on the receiving side of the D2D communication and the transmission instruction received by terminal 400 on the transmission side of the D2D communication.

By doing so, in each D2D communication range, only one terminal 400 transmits the UL data. By this configuration, the transmission of similar (duplicated) environmental information from the same area can be avoided, and terminal 400 that does not transmit the UL data can reduce the communication cost. The number of terminals 400 that transmit the UL data in the same area is not limited to one, and may be limited to some of two or more terminals 400.

It should be noted that other terminals 400 ignore the transmission instruction in the case where the radio quality (for example, received level) of a control signal notifying that the UL data are transmitted is equal to or greater than a predetermined level, and may transmit the UL data according to the transmission instruction in the case where the radio quality of the notification of the transmission state is less than the predetermined level. Alternatively, other terminals 400 ignore the transmission instruction when a distance from terminal 400 of a transmission source of the control information notifying that the UL data are transmitted is within a predetermined value and may transmit the UL data according to the transmission instruction in the case where the distance from terminal 400 of the transmission source is separated from the predetermined value.

By doing so, it is possible to determine with high accuracy whether or not the terminal is terminals 400 which are highly likely to transmit similar environmental information and are close to each other. That is, in the case where the control signal notifying that the UL data are transmitted is received in a specific area, when the radio quality of the control signal is poor or when the distance from terminal 400 of the transmission source of the control signal is separated from a certain distance, it is determined that terminal 400 is present in a different environment from that of terminal 400 that has notified that the UL data are transmitted. That is, terminal 400 determines that the environment information is not similar to that of terminal 400 that has notified that the UL data are transmitted, and transmits the UL data.

In addition, the specific area is not limited to the D2D communication. For example, the specific area may be an area in which dedicated short range communications (DSRC) are performed.

An embodiment of the present invention has been described above.

(Hardware Configuration)

It should be noted that the block diagram used in the description of the above embodiment illustrates blocks of functional units. These functional blocks (configuration sections) are realized by arbitrary combinations of hardware and/or software. In addition, means for realizing each functional block is not particularly limited. That is, each functional block may be realized by one apparatus physically and/or logically combined, and may also be realized by the plurality of apparatuses in which two or more devices physically and/or logically separated are directly and/or indirectly connected (for example, wired and/or wireless).

Figure 12:
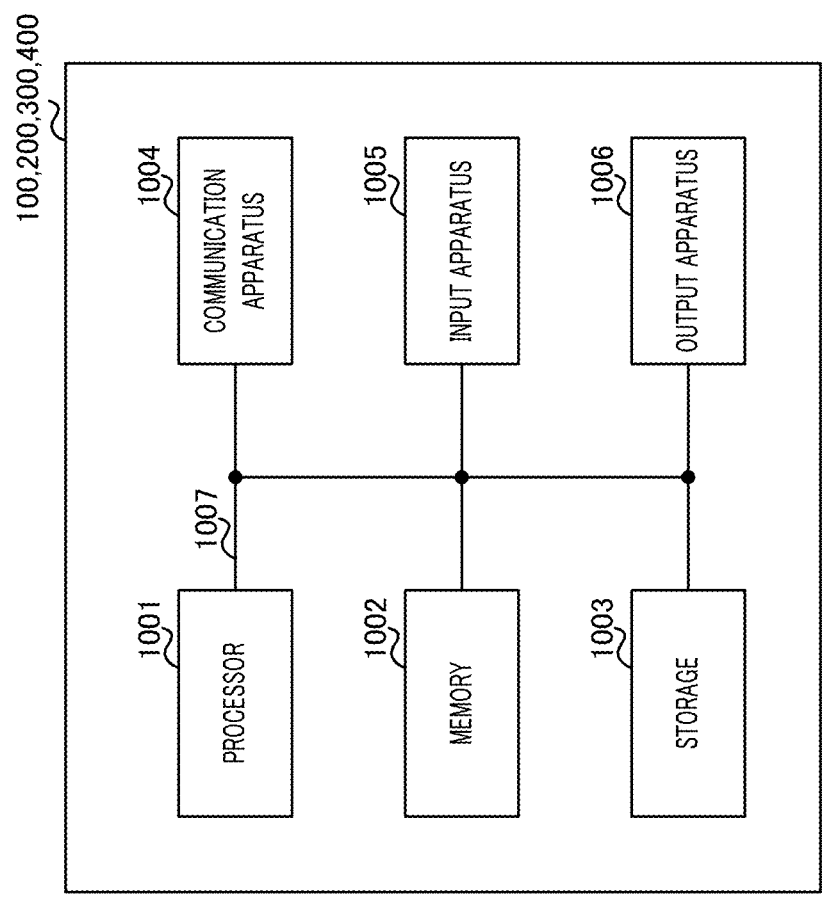
FIG. 12 is a diagram illustrating an example of a hardware configuration of a server apparatus, a base station, and a terminal according to the present invention.

For example, the server apparatus, each apparatus in the core NW node, the base station (radio base station), the terminal (user terminal), and/or the like according to an embodiment of the present invention may function as a computer that performs the process of the communication method of the present invention. FIG. 12 is a diagram illustrating an example of the hardware configuration of the server apparatus, each apparatus in the core NW node, the base station, and the terminal according to an embodiment of the present invention. ITS server (server apparatus) 100, core NW node 200, base station 300, and terminal 400 which are described above may be physically configured as a computer apparatus which includes processor 1001, memory 1002, storage 1003, communication apparatus 1004, input apparatus 1005, output apparatus 1006, bus 1007, and/or the like.

In the following description, the term "apparatus" can be read as a circuit, a device, a unit, and/or the like. The hardware configuration of ITS server 100, core NW node 200, base station 300, and terminal 400 may be configured to include one or a plurality of respective apparatuses illustrated in the drawing, or may be configured not to include some apparatuses.

Each function of ITS server 100, core NW node 200, base station 300, and terminal 400 is realized by reading predetermined software (program) on the hardware such as processor 1001 and memory 1002 to allow processor 1001 to perform a computation and by controlling communication by communication apparatus 1004 or reading and/or writing data from and in memory 1002 and storage 1003.

Processor 1001 operates, for example, an operating system to control the entire computer. Processor 1001 may be constituted by a central processing unit (CPU) including an interface with a peripheral equipment, a control apparatus, a computing apparatus, a register and/or the like. For example, cost information acquirer 101, terminal information acquirer 102, determiner 103, location information generator 401, radio quality measurer 402, transmission controller 404, and/or the like may be realized by processor 1001.

In addition, processor 1001 reads a program (program code), a software module or data from storage 1003 and/or communication apparatus 1004 to memory 1002, and executes various processes according to the read program, software module or data. As the program, the program for causing the computer to execute at least a part of the operations described in the above embodiment is used. For example, determiner 103 of ITS server 100 or transmission controller 404 of terminal 400 may be realized by a control program that is stored in memory 1002 and operated by processor 1001, and may be similarly realized in other functional blocks. Although it has been described that the above-mentioned various processes are executed by one processor 1001, various processes may be executed simultaneously or sequentially by two or more processors 1001. Processor 1001 may be mounted on one or more chips. It should be noted that the program may be transmitted from the network via an electric communication line.

Memory 1002 is a computer-readable recording medium and may be constituted by at least one of a read only memory (ROM), an erasable programmable ROM (EPROM), an electrically erasable programmable ROM (EEPROM), a random access memory (RAM), and/or the like, for example. Memory 1002 may be referred to as a register, a cache, a main memory (primary memory), and/or the like. Memory 1002 can store executable the program (program code), the software module, and/or the like for implementing a radios communication method according to an embodiment of the present invention.

Storage 1003 is a computer-readable recording medium, and may be constituted by at least one of, for example, an optical disk such as a compact disk ROM (CD-ROM), a hard disk drive, a flexible disk, a magneto-optical disk (for example, a compact disk, a digital versatile disk, a Blu-ray (registered trademark) disk, a smart card, a flash memory (for example, a card, a stick, a key drive), a floppy (registered trademark) disk, a magnetic strip, and/or the like. Storage 1003 may be referred to as an auxiliary storage apparatus. The above-mentioned storage medium may be, for example, a database including memory 1002 and/or storage 1003, a server, or other appropriate medium.

Communication apparatus 1004 is hardware (transmission/reception device) for performing communication between computers via a wired and/or wireless network, and is also referred to as, for example, a network device, a network controller, a network card, a communication module, and/or the like. For example, the communicators 104 and 403 and/or the like described above may be realized by communication apparatus 1004.

The input apparatus 1005 is an input device (for example, a keyboard, a mouse, a microphone, a switch, a button, a sensor, and/or the like) which receives an input from the outside. Output apparatus 1006 is an output device (for example, a display, a speaker, an LED lamp, and/or the like) which performs an output to the outside. It should be noted that input apparatus 1005 and output device 1006 may be integrally configured (for example, a touch panel).

In addition, the respective apparatuses such as processor 1001 and memory 1002 are connected to each other by bus 1007 for communicating information. Bus 1007 may be constituted by a single bus or may be constituted by different buses between the apparatuses.

In addition, ITS server 100, core NW node 200, base station 300, and terminal 400 may be configured to include hardware such as a microprocessor, a digital signal processor (DSP), an application specific integrated circuit (ASIC), a programmable logic device (PLD), and a field programmable gate array (FPGA), and some or all of each functional block may be realized by hardware. For example, processor 1001 may be mounted in at least one hardware.

(Notification of Information, Signaling)

In addition, the notification of information is not limited to the aspect/embodiment described in the present specification, and may be performed by other methods. For example, the notification information may be implemented by, physical layer signaling (for example, downlink control information (DCI), uplink control information (UCI), higher layer signaling (for example, radio resource control (RRC) signaling, medium access control (MAC) signaling, broadcast information (master information block (MIB)), system information block (SIB)), other signals, or combinations thereof. In addition, the RRC signaling may be an RRC message, for example, an RRC connection setup message, an RRC connection reconfiguration message, and/or the like.

(Application System)

Each aspect/embodiments described in the present specification may be applied to systems which use long term evolution (LTE), LTE-Advanced (LTE-A), SUPER3G, IMT-Advanced, 4G, 5G, 5G+(5G plus), future radio access (FRA), W-CDMA (registered trademark), GSM (registered trademark), CDMA2000, ultra mobile broadband (UMB), IEEE802.11 (Wi-Fi), IEEE802.16 (WiMAX), IEEE802.20, ultra-wideband (UWB), and Bluetooth (registered trademark), and other suitable systems, and/or a next generation system expanded based on these systems.

(Processing Procedure and/or the Like)

Unless a processing procedure, a sequence, a flowchart and/or the like in each aspect/embodiment described in the present specification are inconsistent, an order may be exchanged. For example, for the methods described in the present specification, elements of various steps are presented in an exemplary order and are not limited to the specific order presented.

(Operation of Base Station)

In the present specification, the specific operation performed by the base station may be performed by an upper node in some cases. In a network including one or a plurality of network nodes having the base station, it is obvious that various operations performed for communication with the terminal may be performed by the base station and/or other network nodes (for example, mobility management entity (MME), serving gateway (S-GW) and/or the like are considered as the network nodes but the network nodes are not limited thereto. The case in which the network node other than the base station is one is exemplified but other network nodes may be combinations (for example, MME and S-GW) of a plurality of other network nodes.

(Direction of Input/Output)

Information, signals, and/or the like can be output from the higher layer (or lower layer) to the lower layer (or higher layer). The information, the signals and/or the like may be input/output via a plurality of network nodes.

(Handling of Input/Output Information and/or the Like)

The information and/or the like which are input/output may be stored in a specific place (for example, a memory) or managed in a management table. The information and/or the like which are input/output can be overwritten, updated, or additionally written. The information and/or the like which are output may be deleted. The information and/or the like which are input may be transmitted to another apparatus.

(Determination Method)

The determination may be performed by a value (0 or 1) represented by 1 bit, may be performed by a Boolean value (true or false), or may be performed by comparing numerical values (for example, comparison with a predetermined value), (Software)

Software should be interpreted broadly to mean an instruction, an instruction set, a code, a code segment, a program code, a program, a sub-program, a software module, application, software application, software package, a routine, an object, an executable file, an execution thread, a procedure, a function, and/or the like irrespective of being called a descriptive language of software, firmware, middleware, microcode, and hardware, or any other names.

In addition, the software, the instruction, and/or the like may be transmitted and received via a transmission medium. For example, when the software may be transmitted from website, a server, or other remote sources using wired technologies such as coaxial cable, a fiber optic cable, a twisted pair and a digital subscriber line (DSL) and/or wireless technologies such as infrared, wireless and microwave, these wired and/or wireless technologies are included within the definition of the transmission medium.

(Information, Signal)

The information, the signals, and/or the like described in the present specification may be represented using any of a variety of different technologies. For example, data, instructions, commands, information, signals, bits, symbols, chips, and/or the like which may be mentioned throughout the above description may be represented by a voltage, a current, an electromagnetic wave, a magnetic field or magnetic particles, an optical field or photons, or any combination thereof.

It should be noted that the terms described in the present specification and/or terms necessary for understanding the present specification may be replaced by terms having the same or similar meanings. For example, the channel and/or symbol may be a signal. Also, the signal may be a message. In addition, a component carrier (CC) may be referred to as a carrier frequency, a cell, and/or the like.

(System, Network)

The terms "system" and "network" used in the present specification are used interchangeably.

(Names of Parameter and Channel)

In addition, the information, the parameters, and/or the like described in the present specification may be represented by an absolute value, may be represented by a relative value from a predetermined value, or may be represented by other corresponding information. For example, the radio resource may be indicated by an index.

The name used for the above-mentioned parameters is not limited in any respect. In addition, mathematical expressions and/or the like using these parameters may be different from those explicitly disclosed in this specification. Since various channels (for example, PUCCH, PDCCH, and/or the like) and information elements (for example, TPC and/or the like) can be identified by any suitable name, various names assigned to these various channels and information elements are not limited in any respect.

(Base Station)

The base station can accommodate one or more (for example, three) cells (also referred to as sectors). In the case where the base station accommodates a plurality of cells, the entire coverage area of the base station can be divided into a plurality of smaller areas, and each smaller area can provide communication services by a base station subsystem (for example, an indoor small base station: remote radio head (RRH)). The term "cell" or "sector" indicates a part or the whole of the coverage area of the base station and/or base station subsystem that performs communication service in this coverage. In addition, the terms "base station", "eNB", "cell" and "sector" may be used interchangeably in the present specification. The base station may also be referred to as a fixed station, a Node B, an eNode B (eNB), an access point, a femto cell, a small cell, and/or the like.

(Terminal)

The terminal may be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, user equipment (UE), or some other suitable term by those skilled in the art.

(Meaning and Interpretation of Terms)

The terms "determining" and "determining" used in the present specification may include a wide variety of operations. The "determining" and the "determining" may include, ones regarding, for example, judging, calculating, computing, processing, deriving, investigating, looking up (for example, looking up in a table, a database or another data structure), and ascertaining as "determining" and "determining". In addition, the "determination" and the "determination" may include ones regarding "receiving" (for example, receiving information), transmitting (for example, transmitting information), an input, an output, accessing (for example, accessing data in memory) as "determining" and "determining". In addition, the "determining" and the "determining" may include ones regarding ones such as resolving, selecting, choosing, establishing, and comparing as "determining" and "determining". That is, the "determining" and the "determining" may include ones "determining" and "determining" some operations.

The terms "connected", "coupled", or any variations thereof means any direct or indirect connection or coupling between two or more elements, and may mean that one or more intermediate elements are provided between two elements "connected" or "coupled" to each other. The coupling or connection between the elements may be physical, logical, or a combination thereof. As used in the present specification, two elements can be considered as being "connected" or "coupled" to each other by one or more wires, using cables and/or printed electrical connections, and by using electromagnetic energy such as electromagnetic energy and/or the like having wavelengths of a radio frequency domain, a microwave region, and a light (both visible and invisible) region as some non-limiting and non-exhaustive examples.

The statement "based on" used in the present specification does not mean "~only based on" unless explicitly stated otherwise. In other words, the statement "~based on" means both "~only based on" and "~at least based on".

The reference to elements using a designation such as "first" and "second" used in the present specification generally does not limit the amount or order of those elements. These designations can be used in the present specification as a convenient way to distinguish between two or more elements. Therefore, the reference to the first and second elements does not mean that only two elements can be adopted there, or does not mean that the first element should precede the second element in some form or other.

The "section" in the configuration of each of the apparatuses may be replaced with "means", "circuit", "device", and/or the like.

As long as "including", "comprising", and variations thereof are used in the specification or claims, these terms are intended to be comprehensive like the term "comprising". In addition, the term "or" used in the specification or claims is intended to be not an exclusive-OR.

In the whole of the present disclosure, if articles like, for example, a, an, and the in English are added by translation, unless it is indicated that these articles are obviously not so from the context, it shall include plural ones.

(Variations and/or the Like of Aspects)

Each aspect/embodiment described in the present specification may be used singly or in combination, or may be switched in accordance with execution. In addition, the notification of the predetermined information (for example, notification of "being X") is not limited to being performed explicitly, but may be performed implicitly (for example, not notifying the predetermined information).

While the present invention has been described in detail, it will be apparent to those skilled in the art that the present invention is not limited to the embodiments described herein. The present invention can be implemented as modifications and changes without departing from the spirit and scope of the present invention as defined by the scope of the claims. Therefore, the description of the present specification is for the purpose of illustration and does not have any restrictive meaning to the present invention.

This application is based upon and claims the benefit of priority from Japanese Patent Application No. 2016-193759, filed Sep. 30, 2016, the entire contents of Japanese Patent Application No. 2016-193759 are incorporated herein by reference

INDUSTRIAL APPLICABILITY

An aspect of the present invention is useful for a mobile communication system.

REFERENCE SIGNS LIST

100 ITS server
101 Cost information acquirer
102 Terminal information acquirer
103 Determiner
104, 403 Communicator
200 Core NW node
201 Location registration server
202 Billing server
203 GW
300 Base station
400 Terminal
401 Location information generator
402 Radio quality measurer
404 Transmission controller

The invention claimed is:

1. A server apparatus, comprising:
a determiner that determines a first terminal which transmits uplink data in a first communication area in which communication cost is less than a first threshold value, based on the communication cost and a location of at least one terminal in a communication area in which the at least one terminal is communicable; and
a communicator that transmits a transmission instruction of the uplink data in the first communication area to the first terminal and receives the uplink data from the first terminal.

2. The server apparatus according to claim 1, wherein
the determiner determines whether radio quality in the first terminal is equal to or greater than a second threshold value, and
the communicator transmits the transmission instruction to the first terminal when the radio quality is equal to or greater than the second threshold value.

3. The server apparatus according to claim 1, wherein
the communication cost is associated with a combination of the communication area and a transmission time in the communication area,
the determiner determines the first terminal which transmits the uplink data in the communication area and at the transmission time in a first combination in which the communication cost is less than the first threshold value, and
the communicator transmits the transmission instruction in the communication area and at the transmission time in the first combination to the first terminal.

4. The server apparatus according to claim 1, wherein
the determiner predicts a location of a moving destination of the at least one terminal and determines the first terminal based on the predicted location of the moving destination.

5. The server apparatus according to claim 1, wherein
the communicator receives the uplink data from only one or some of a plurality of the first terminals located in the first communication area.

6. A communication method, comprising:
determining a first terminal which transmits uplink data in a first communication area in which communication cost is less than a threshold value
based on the communication cost in a communication area in which the at least one terminal is communicable and the location of the at least one terminal; and
transmitting a transmission instruction of the uplink data in the first communication area to the first terminal; and
receiving the uplink data from the first terminal.

\* \* \* \* \*